US012030421B2

(12) United States Patent
Leger et al.

(10) Patent No.: US 12,030,421 B2
(45) Date of Patent: *Jul. 9, 2024

(54) INSTALLATION TRAILER FOR COILED FLEXIBLE PIPE AND METHOD OF UTILIZING SAME

(71) Applicant: Trinity Bay Equipment Holdings, LLC, Houston, TX (US)

(72) Inventors: John P. Leger, Baytown, TX (US); Peter A. Parker, Beech Creek, PA (US); Kraig A. Tabor, Houston, TX (US); Jagtar Thethy, Houston, TX (US); Alexander Lee Winn, Houston, TX (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/144,318

(22) Filed: May 8, 2023

(65) Prior Publication Data

US 2023/0271542 A1    Aug. 31, 2023

Related U.S. Application Data

(63) Continuation of application No. 17/374,341, filed on Jul. 13, 2021, now Pat. No. 11,643,000, which is a
(Continued)

(51) Int. Cl.
*B60P 3/035*    (2006.01)
*B60T 7/20*     (2006.01)
(Continued)

(52) U.S. Cl.
CPC ............ *B60P 3/035* (2013.01); *B65H 75/425* (2013.01); *B60T 7/20* (2013.01); *B60T 11/107* (2013.01);
(Continued)

(58) Field of Classification Search
None
See application file for complete search history.

(56) References Cited

U.S. PATENT DOCUMENTS 1,839,320 A    1/1932  Kellems
2,266,629 A   12/1941  Flynn
(Continued)

FOREIGN PATENT DOCUMENTS

AU    2014299014    1/2019
AU    2014363465    1/2019
(Continued)

OTHER PUBLICATIONS

Office Action for Brazilian Application No. 112021006870-8 mailed Jan. 5, 2023, 4 pages.
(Continued)

*Primary Examiner* — William A. Rivera
(74) *Attorney, Agent, or Firm* — Greenberg Traurig, LLP; Dwayne Mason; Ira Hatton

(57) ABSTRACT

A system includes a collapsible trailer frame and a lifting mechanism coupled to the collapsible trailer frame. The lifting mechanism is configured to raise or lower a coil of pipe or a reel of pipe. The system also includes a braking mechanism.

20 Claims, 18 Drawing Sheets

Related U.S. Application Data continuation of application No. 16/599,485, filed on Oct. 11, 2019, now Pat. No. 11,066,002.

(60) Provisional application No. 62/745,052, filed on Oct. 12, 2018.

(51) Int. Cl.
  *B60T 11/10* (2006.01)
  *B65H 49/32* (2006.01)
  *B65H 75/42* (2006.01)
  *E21B 19/22* (2006.01)

(52) U.S. Cl.
  CPC .......... *B65H 49/32* (2013.01); *B65H 2701/33* (2013.01); *E21B 19/22* (2013.01)

(56) References Cited

U.S. PATENT DOCUMENTS

| | | | |
|---|---|---|---|
| 2,652,630 A | 9/1953 | Niland | |
| 2,775,357 A | 12/1956 | De Arment | |
| 2,780,419 A | 2/1957 | Hall | |
| 2,793,773 A | 5/1957 | De Boliac | |
| 2,905,406 A | 9/1959 | Falck-Pedersen | |
| 2,923,194 A | 2/1960 | Ambier et al. | |
| 3,048,348 A | 8/1962 | Griffin | |
| 3,116,781 A | 1/1964 | Woolley | |
| 3,243,141 A | 3/1966 | Cook et al. | |
| 3,369,823 A | 2/1968 | Tomen | |
| 3,470,923 A | 10/1969 | Besthorne | |
| 3,528,332 A | 9/1970 | Thumim et al. | |
| 3,726,164 A | 4/1973 | Cocquebert | |
| 3,851,552 A | 12/1974 | English et al. | |
| 4,148,445 A | 4/1979 | Reynolds et al. | |
| 4,190,211 A | 2/1980 | Janzen | |
| 4,194,702 A | 3/1980 | Ploeg | |
| 4,265,304 A | 5/1981 | Baugh | |
| 4,322,045 A | 3/1982 | Tellier | |
| 4,454,999 A | 6/1984 | Woodruff | |
| 4,538,775 A | 9/1985 | Deissenberger | |
| 4,673,035 A | 6/1987 | Gipson | |
| 4,701,098 A | 10/1987 | Bills et al. | |
| 4,941,798 A | 7/1990 | Meier | |
| 5,807,053 A | 9/1998 | Pride | |
| 5,842,530 A | 12/1998 | Smith et al. | |
| 5,848,641 A | 12/1998 | Epp | |
| 5,895,197 A | 4/1999 | Mc Vaugh | |
| 6,276,454 B1 | 8/2001 | Fontana et al. | |
| 6,419,424 B1 | 7/2002 | Null et al. | |
| 6,439,279 B1 | 8/2002 | Underwood | |
| 6,502,641 B1 | 1/2003 | Carriere et al. | |
| 7,343,725 B2 | 3/2008 | Kendall | |
| 7,810,574 B2 | 10/2010 | Stukey et al. | |
| 7,874,510 B2 | 1/2011 | Martin et al. | |
| 8,985,496 B2 | 3/2015 | Dillinger et al. | |
| 9,316,067 B1 | 4/2016 | Lu et al. | |
| 9,476,269 B2 | 10/2016 | Dyck | |
| 9,961,842 B2 | 5/2018 | Dove | |
| 9,975,727 B1 | 5/2018 | Jordan et al. | |
| 10,190,722 B2 | 1/2019 | Espinasse et al. | |
| 10,197,198 B2 | 2/2019 | Glejbol | |
| 10,226,823 B2 | 3/2019 | Karpachevskyy | |
| 10,226,892 B2 | 3/2019 | Kremers | |
| 10,234,068 B2 | 3/2019 | Varagnolo et al. | |
| 10,281,065 B2 | 5/2019 | Secher et al. | |
| 10,285,223 B2 | 5/2019 | Hatton et al. | |
| 10,288,207 B2 | 5/2019 | Littlestar et al. | |
| 10,378,682 B2 | 8/2019 | Cloos et al. | |
| 10,408,795 B2 | 9/2019 | Nicolas et al. | |
| 10,415,731 B2 | 9/2019 | Boche et al. | |
| 10,429,267 B2 | 10/2019 | Grimsley | |
| 10,436,667 B2 | 10/2019 | Littlestar et al. | |
| 10,442,925 B2 | 10/2019 | Rong et al. | |
| 10,451,206 B2 | 10/2019 | Espinasse et al. | |
| 10,471,661 B2 | 11/2019 | Boczkowski et al. | |
| 10,480,054 B2 | 11/2019 | Valdez et al. | |
| 10,487,965 B2 | 11/2019 | Bouey et al. | |
| 10,494,519 B2 | 12/2019 | Wilson et al. | |
| 10,513,896 B2 | 12/2019 | Gudme et al. | |
| 10,527,198 B2 | 1/2020 | Nicolson et al. | |
| 10,544,889 B2 | 1/2020 | Bouey et al. | |
| 10,544,892 B2 | 1/2020 | Holst | |
| 10,723,254 B2 | 7/2020 | Barnett et al. | |
| 10,787,339 B1* | 9/2020 | Alves | B65H 75/4478 |
| 10,807,511 B2* | 10/2020 | Barnett | B65H 67/02 |
| 11,014,775 B1 | 5/2021 | Alves | F16L 1/065 |
| 11,066,002 B2 | 7/2021 | Leger | B65H 75/425 |
| 11,242,217 B1* | 2/2022 | Leger | B65H 75/425 |
| 11,643,000 B2* | 5/2023 | Leger | B65H 75/2209 |
| | | | 242/390.5 |
| 11,820,625 B2* | 11/2023 | Garcia | B65H 75/242 |
| 2005/0217453 A1 | 10/2005 | Matthes et al. | |
| 2011/0182707 A1 | 7/2011 | Defudes et al. | |
| 2012/0061504 A1 | 3/2012 | Powell | |
| 2013/0121801 A1 | 5/2013 | Gipson et al. | |
| 2014/0086688 A1 | 3/2014 | Hull et al. | |
| 2014/0191076 A1 | 7/2014 | Dillinger | B65H 49/30 |
| | | | 242/575 |
| 2015/0158692 A1 | 6/2015 | Reynolds et al. | |
| 2015/0292282 A1 | 10/2015 | Dyck et al. | |
| 2015/0315861 A1 | 11/2015 | Zachariasen et al. | |
| 2018/0022261 A1 | 1/2018 | Weber et al. | |
| 2018/0099428 A1 | 4/2018 | Hegler | |
| 2018/0186269 A1 | 7/2018 | Barnett et al. | |
| 2019/0003921 A1 | 1/2019 | Nicholas | |
| 2019/0024830 A1 | 1/2019 | Glejbol | |
| 2019/0094101 A1 | 3/2019 | Spiegel et al. | |
| 2019/0101233 A1 | 4/2019 | Hatton et al. | |
| 2019/0126567 A1 | 5/2019 | Bornemann et al. | |
| 2019/0154186 A1 | 5/2019 | Varagnolo et al. | |
| 2019/0162334 A1 | 5/2019 | Westhoff et al. | |
| 2019/0162335 A1 | 5/2019 | Yu et al. | |
| 2019/0162336 A1 | 5/2019 | Andersen et al. | |
| 2019/0186656 A1 | 6/2019 | Kozak et al. | |
| 2019/0194440 A1 | 6/2019 | Rong et al. | |
| 2019/0217337 A1 | 7/2019 | Gujare et al. | |
| 2019/0219473 A1 | 7/2019 | Littlestar et al. | |
| 2019/0232853 A1 | 8/2019 | Barnett | |
| 2019/0242501 A1 | 8/2019 | Bereczkné | |
| 2019/0257448 A1 | 8/2019 | Chalmers et al. | |
| 2019/0285199 A1 | 9/2019 | Nicolson et al. | |
| 2019/0309582 A1 | 10/2019 | Procida | |
| 2019/0338868 A1 | 11/2019 | Hjorth | |
| 2019/0368967 A1 | 12/2019 | Grimsley | |
| 2019/0391097 A1 | 12/2019 | Nicolas et al. | |
| 2020/0011467 A1 | 1/2020 | Holst | |
| 2020/0114799 A1 | 4/2020 | Leger | |
| 2021/0031666 A1 | 2/2021 | Barnett | |

FOREIGN PATENT DOCUMENTS

| | | |
|---|---|---|
| AU | 2017302735 | 1/2019 |
| AU | 2014310509 | 3/2019 |
| AU | 2017319390 | 3/2019 |
| AU | 2017347152 | 5/2019 |
| AU | 2017365730 | 6/2019 |
| AU | 2018211384 | 8/2019 |
| AU | 2018222217 | 8/2019 |
| AU | 2015335367 | 10/2019 |
| AU | 2015345613 | 10/2019 |
| AU | 2018288000 | 1/2020 |
| AU | 2019279941 | 1/2020 |
| BR | 112014017998 | 1/2019 |
| BR | 112018013586 | 1/2019 |
| BR | PI0810573 | 1/2019 |
| BR | PI0819542 | 1/2019 |
| BR | 112019001414 | 2/2019 |
| BR | 112018075840 | 3/2019 |
| BR | 112019004048 | 3/2019 |
| BR | PI0517181 | 3/2019 |
| BR | 112019000076 | 4/2019 |
| BR | 112019007789 | 4/2019 |
| BR | PI0914836 | 4/2019 |
| BR | 112019003669 | 5/2019 |

(56) References Cited

FOREIGN PATENT DOCUMENTS

| | | |
|---|---|---|
| BR | 112019005154 | 6/2019 |
| BR | 112013032388 | 7/2019 |
| BR | 112019013850 | 7/2019 |
| BR | PI0720487 | 8/2019 |
| BR | 112012015257 | 9/2019 |
| BR | 112013017957 | 9/2019 |
| BR | 112015027495 | 9/2019 |
| BR | 112016001932 | 9/2019 |
| BR | PI0909348 | 9/2019 |
| BR | 112015002088 | 10/2019 |
| BR | 112019020051 | 10/2019 |
| BR | 112012020776 | 11/2019 |
| BR | 112019012614 | 11/2019 |
| BR | P10808956 | 11/2019 |
| BR | 112013028806 | 12/2019 |
| BR | 112013000428 | 1/2020 |
| BR | PI0924891 | 1/2020 |
| CA | 2859433 | 3/2019 |
| CA | 2823056 | 4/2019 |
| CA | 2765294 | 6/2019 |
| CA | 2854955 | 6/2019 |
| CA | 2835008 | 8/2019 |
| CA | 3012146 | 1/2020 |
| CN | 1209788 | 3/1999 |
| CN | 202906350 | 4/2013 |
| CN | 109153196 | 1/2019 |
| CN | 109153229 | 1/2019 |
| CN | 109958827 | 7/2019 |
| CN | 109996749 | 7/2019 |
| CN | 110177969 | 8/2019 |
| CN | 106985493 | 11/2019 |
| CN | 108291686 | 11/2019 |
| CN | 110461586 | 11/2019 |
| CN | 110462273 | 11/2019 |
| CN | 107250643 | 12/2019 |
| CN | 108291670 | 1/2020 |
| CN | 109982921 | 11/2020 |
| DE | 102018214615 | 6/2019 |
| DK | 3224393 T3 | 1/2019 |
| DK | 2820083 T3 | 2/2019 |
| DK | 2959199 T5 | 2/2019 |
| DK | 3228639 T3 | 2/2019 |
| DK | 2780159 T3 | 4/2019 |
| DK | 3196523 T3 | 4/2019 |
| DK | 2516534 | 7/2019 |
| DK | 2901062 T3 | 8/2019 |
| DK | 3286474 T3 | 9/2019 |
| EA | 201990872 | 9/2019 |
| EP | 2353808 | 8/2011 |
| EP | 2360406 | 1/2019 |
| EP | 2780159 | 1/2019 |
| EP | 3069063 | 1/2019 |
| EP | 3433523 | 1/2019 |
| EP | 3089846 | 2/2019 |
| EP | 3334969 | 2/2019 |
| EP | 3334970 | 2/2019 |
| EP | 3439871 | 2/2019 |
| EP | 2386894 | 3/2019 |
| EP | 2516534 | 3/2019 |
| EP | 2737238 | 3/2019 |
| EP | 2859173 | 3/2019 |
| EP | 3371502 | 3/2019 |
| EP | 3455059 | 3/2019 |
| EP | 3455536 | 3/2019 |
| EP | 3458531 | 3/2019 |
| EP | 2862700 | 4/2019 |
| EP | 3105484 | 4/2019 |
| EP | 3258155 | 4/2019 |
| EP | 3334965 | 4/2019 |
| EP | 3334967 | 4/2019 |
| EP | 3463849 | 4/2019 |
| EP | 3468725 | 4/2019 |
| EP | 3314155 | 5/2019 |
| EP | 3488135 | 5/2019 |
| EP | 2519764 | 6/2019 |
| EP | 2572134 | 7/2019 |
| EP | 2661578 | 7/2019 |
| EP | 3507535 | 7/2019 |
| EP | 3513108 | 7/2019 |
| EP | 2576333 | 8/2019 |
| EP | 3014157 | 8/2019 |
| EP | 3059481 | 8/2019 |
| EP | 3523233 | 8/2019 |
| EP | 3526437 | 8/2019 |
| EP | 2588787 | 9/2019 |
| EP | 2870397 | 9/2019 |
| EP | 3093546 | 10/2019 |
| EP | 3548280 | 10/2019 |
| EP | 3350498 | 12/2019 |
| EP | 3482112 | 12/2019 |
| EP | 3583344 | 12/2019 |
| FR | 3068104 | 7/2019 |
| FR | 3077997 | 8/2019 |
| FR | 3074251 | 12/2019 |
| FR | 3076337 | 1/2020 |
| GB | 2264923 | 9/1993 |
| GB | 2503880 | 3/2019 |
| GB | 2562674 | 3/2019 |
| GB | 2557571 | 9/2019 |
| GB | 2572120 | 9/2019 |
| GB | 2520756 | 10/2019 |
| GB | 2535925 | 12/2019 |
| GB | 2574296 | 12/2019 |
| HU | E045956 T2 | 1/2020 |
| IN | 330637 | 1/2020 |
| PL | 2678216 T3 | 2/2019 |
| PL | 2379299 T3 | 5/2019 |
| RU | 2018113428 | 10/2019 |
| WO | 1997/026206 | 7/1997 |
| WO | 2018/071336 | 4/2018 |
| WO | 2019/016554 | 1/2019 |
| WO | 2019/016558 | 1/2019 |
| WO | 2019/073047 | 4/2019 |
| WO | 2019/022599 | 5/2019 |
| WO | 2019/099219 | 5/2019 |
| WO | 2019/105926 | 6/2019 |
| WO | 2019/112431 | 6/2019 |
| WO | 2019/120677 | 6/2019 |
| WO | 2019/141326 | 7/2019 |
| WO | 2019/165562 | 9/2019 |
| WO | 2019/197538 | 10/2019 |
| WO | 2019/207031 | 10/2019 |
| WO | 2019/238456 | 12/2019 |
| WO | 2020/016325 | 1/2020 |
| WO | 2020/077201 | 4/2020 |

OTHER PUBLICATIONS

Patent Office, Department of Intellectual Property; Office Action, issue in connection to application No. 1901002139; Oct. 30, 2021; 2 pages; Thailand.

Bolivian Patent Office; Office Action, issued in connection to patent application No. SP176-2019I; Dec. 10, 2021; 11 pages; Bolivia.

Republic of Colomiba, Superintendence of Industry and Commerce; Office Action issued in connection to application No. NC2019/0003948; Oct. 5, 2021; 17 pages; Colombia.

Brooksbrothers; Expandable Reel Stand: Reel Trailers; Apr. 24, 2015; 7 pages; https://www.brooksbrotherstrailers.com/products/reel-trailers/expandable-reel-stand/.

Ministry of Law and Human Rights Republic of Indonesia; Office Action, issued in connecton to application No. PID201902925; Oct. 7, 2021; 4 pages; Indonesia.

Government of The Republic of Trinidad and Tobago, Intellectual Property Office; Office Action, issued in connection to application No. TT/A/2019/00034; Sep. 30, 2021; 1 page; Spain.

The International Bereau of WIPO; PCT International Preliminary Report on Patentability, issued in connection to PCT/US2017/055772; Apr. 25, 2019; 8 pages; Switzerland.

United States Patent and Tradeamrk Office; PCT International Search Report, issued in connection to PCT/US2017055772; Dec. 26, 2017; 2 pages; US.

(56) References Cited

OTHER PUBLICATIONS

United States Patent and Tradeamrk Office; PCT Written Opinion of the International Searching Authority, Issued in connection to PCT/US2017055772; Dec. 26, 2017; 6 pages; US.

United States Patent and Tradeamrk Office; PCT International Search Report, issued in connection to PCT/US219/055823; Dec. 19, 2019; 2 pages; US.

United States Patent and Tradeamrk Office; PCT Written Opinion of the International Searching Authority, Issued in connection to PCT/US219/055823; Dec. 19, 2019; 5 pages; US.

Eurasian Patent Office; Office Action, issued in connection to application No. 201990872/31; Mar. 23, 2020; 5 pages; Russia.

China National Intellectual Property Administration; First Office Action, issued in connection to patent application No. 2017800727836; Mar. 2, 2020; China.

European Patent Office; Extended European Search Report, issued in connection to application No. EP17860186.0; Apr. 24, 2020; 8 pages; Europe.

Intellectual Property of Iran; Office Action, issued in connection to application No. 139850140003000366, Jun. 15, 2020; 27 pages; Iran.

Pakistan Patent Office; First Examination Report, issued in connection to application No. 683/2019; 2020; 1 page; Pakistan.

Pakistan Patent Office; Examination Report, issued in connection to patent application No. 528/2017; Oct. 2019; 1 page; Pakistan.

The Eurasian Patent Organization; Examination Report, issued in connection to patent application No. 201990872; Nov. 9, 2020; 4 pages; Russia.

National Institute of Industrial Property of Argentina; Office Action, issued in connection with patent application No. 20170102827; Nov. 5, 2020; 4 pages; Argentina.

Republic of Colomiba, Superintendence of Industry and Commerce; Office Action issued in connection to application No. NC2019/0003948; Feb. 23, 2021; 25 pages; Colombia.

Ministry of Law and Human Rights Republic of Indonesia; Office Action, issued in connecton to application No. PID201902925; Apr. 30, 2021; 5 pages; Indonesia.

Saudi Authority for Intellectual Property; Office Action issued in connection to application No. 519401505; Mar. 23, 2021; 3 pages; Saudi Arabia.

Intellectual Property Office of India; Office Action, issued in conneciton to application No. 201917017436: Mar. 31, 2021; 6 pages; India.

European Patent Office; Communication Pursuant to Article 94(3) EPC, issued in connection to application No. 17860186.0; Apr. 8, 2021; 5 pages; Europe.

Pakistan Patent Office; Examination Report, issued in connection to application No. 527/2017; Jun. 2021; 3 page; Pakistan.

\* cited by examiner

INSTALLATION TRAILER FOR COILED FLEXIBLE PIPE AND METHOD OF UTILIZING SAME

CROSS-REFERENCE

The present disclosure claims priority to and benefit of U.S. application Ser. No. 17/374,341, entitled "INSTALLATION TRAILER FOR COILED FLEXIBLE PIPE AND METHOD OF UTILIZING SAME" and filed Jul. 13, 2021, which claims priority to and benefit of U.S. application Ser. No. 16/599,485, entitled "INSTALLATION TRAILER FOR COILED FLEXIBLE PIPE AND METHOD OF UTILIZING SAME," filed Oct. 11, 2019, and issued as U.S. Pat. No. 11,066,002, which claims priority to and benefit of U.S. Provisional Application No. 62/745,052, entitled "INSTALLATION TRAILER FOR COILED FLEXIBLE PIPE AND METHOD OF UTILIZING SAME" and filed Oct. 12, 2018, which are each incorporated herein in its entirety for all purposes.

BACKGROUND

Flexible pipe is useful in a myriad of environments, including in the oil and gas industry. Flexible pipe may be durable and operational in harsh operating conditions and can accommodate high pressures and temperatures. Flexible pipe may be bundled and arranged into one or more coils to facilitate transporting and using the pipe.

Coils of pipe may be positioned in an "eye to the side" or "eye to the sky" orientation. When the flexible pipe is coiled and is disposed with its interior channel facing upwards, such that the coil is in a horizontal orientation, then the coils of pipe are referred to as being in an "eye to the sky" orientation. If, instead, the flexible pipe is coiled and disposed such that the interior channel is not facing upwards, such that the coil is in an upright or vertical orientation, then the coils of pipe are referred to as being in an "eye to the side" orientation.

The flexible pipe may be transported as coils to various sites for deployment (also referred to as uncoiling or unspooling). Different types of devices and vehicles are currently used for loading and transporting coils of pipe, but usually extra equipment and human manual labor is also involved in the process of loading or unloading such coils for transportation and/or deployment. Such coils of pipe are often quite large and heavy. Accordingly, there exists a need for an improved method and apparatus for loading and unloading coils of pipe.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments of the present disclosure relate to a system that includes a collapsible trailer frame and a lifting mechanism coupled to the collapsible trailer frame. The lifting mechanism is configured to raise or lower a coil of pipe or a reel of pipe. The system also includes a braking mechanism.

In another aspect, embodiments of the present disclosure relate to a method that includes providing a trailer having a collapsible trailer frame, a lifting mechanism coupled to the trailer frame, and a braking mechanism. The method also includes coupling a coil of pipe or a reel of pipe to the lifting mechanism, adjusting a vertical position of the coil of pipe or the reel of pipe via the lifting mechanism, deploying the pipe via rotation of the coil of pipe or the reel of pipe, and applying pressure via the braking mechanism to a drum assembly inserted into the coil of pipe or applying pressure via the braking mechanism to the reel of pipe.

Other aspects and advantages of the claimed subject matter will be apparent from the following description and the appended claims.

DETAILED DESCRIPTION

Figure 1:
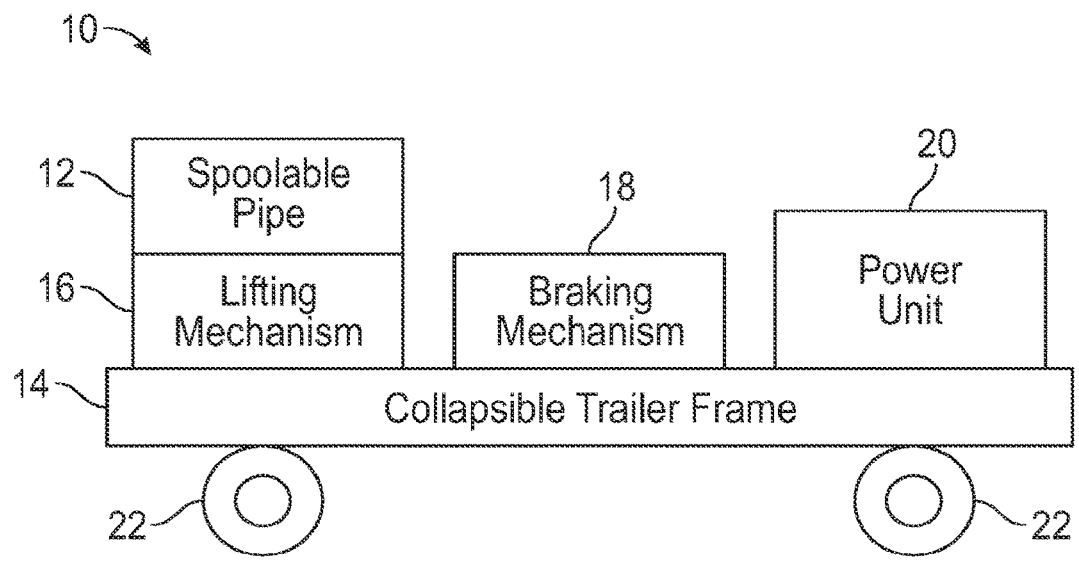
FIG. 1 is a diagram of a collapsible installation trailer according to embodiments of the present disclosure.

Embodiments of the present disclosure relate generally to systems used for deploying coils of flexible pipe. The coils of pipe may be self-supported, for example, using bands to hold coils together, or the coils of pipe may be supported around a reel (which may be referred to as reel of pipe). Deployment systems according to embodiments of the present disclosure may include a collapsible installation trailer that includes a trailer frame, a lifting mechanism coupled to the trailer frame that is configured to raise or lower a coil of pipe or a reel of pipe, and a braking mechanism.

Embodiments of the present disclosure will be described below with reference to the figures. In one aspect, embodiments disclosed herein relate to embodiments for deploying spoolable pipe from a collapsible installation trailer.

As used herein, the term "coupled" or "coupled to" may indicate establishing either a direct or indirect connection, and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

FIG. 1 illustrates a block diagram of an embodiment of a collapsible installation trailer 10. As described in detail below, the collapsible installation trailer 10 may be used to deploy spoolable pipe 12, which may refer to any type of flexible pipe or piping capable of being bent into a coil. The spoolable pipe 12 may be wound on a spool or reel, or the spoolable pipe 12 may be handled as coils without spools or reels. Such reels or coils of spoolable pipe 12 may reduce the amount of space taken up by pipe during manufacturing, shipping, transportation, and deployment compared to rigid pipe that is not capable of being bent into a coil.

Flexible or spoolable pipe is a tube to convey or transfer any water, gas, oil, or any type of suitable fluid. The spoolable pipe 12 may be made of any type of materials including plastics, metals, composites (e.g., fiber-reinforced composites), and/or other suitable materials. The spoolable pipe 12 is used frequently in many applications, including without limitation, both onshore and offshore oil and gas applications. The spoolable pipe 12 may be a flexible pipe, which may include Bonded or Unbonded Flexible Pipe, Flexible Composite Pipe (FCP), Thermoplastic Composite Pipe (TCP), or Reinforced Thermoplastic Pipe (RTP). FCP or RTP pipe may itself be generally composed of several layers. In one or more embodiments, a flexible pipe may include a thermoplastic liner or internal pressure sheath having a reinforcement layer and a thermoplastic outer cover layer. In one or more embodiments, the thermoplastic may be high-density polyethylene (HDPE). Thus, flexible pipe may include different layers that may be made of a variety of materials and may also provide corrosion resistance. For example, in one or more embodiments, pipe used to make up a coil of pipe may have a corrosion protection outer cover layer that is disposed over another layer of steel reinforcement. In this embodiment, helically wound steel strips may be placed over a liner made of thermoplastic pipe. Flexible pipe may be designed to handle a variety of pressures. Accordingly, flexible pipe may offer unique features and benefits versus steel/carbon steel pipe lines in the area of corrosion resistance, flexibility, installation speed, and re-usability. Another type of flexible or spoolable pipe is coiled tubing or reeled tubing, which may be made of steel and have a corrosion protection shield layer.

The collapsible installation trailer 10 of FIG. 1 includes a collapsible trailer frame 14 that provides a base and support for other components of the collapsible installation trailer 10, such as a lifting mechanism 16 coupled to the collapsible trailer frame 14. The collapsible trailer frame 14 may be constructed of one or more structural components, such as, but not limited to, beams, columns, posts, tubes, sheets, and so forth, coupled to one another via various techniques, such as, but not limited to, bolts, screws, slots and tabs, welds, brazing, and so forth. The collapsible trailer frame 14 may be made from steel, other metal alloys, or composite structural members. In certain embodiments, the collapsible trailer frame 14 enables the collapsible trailer frame 14 to take up less space when being shipped or transported. The lifting mechanism 16 may be configured to raise or lower a coil of spoolable pipe 12 or a reel of spoolable pipe 12, as described in detail below. The collapsible installation trailer 10 may also include a braking mechanism 18 configured to apply back tension to the spoolable pipe 12 while the spoolable pipe 12 is being deployed by the collapsible installation trailer 10, as described in detail below. Finally, the collapsible installation trailer 10 may include a power unit 20 configured to power various components of the installation trailer 10, which may include hydraulic power, electrical power, or mechanical power. The power unit 20 may be coupled to the collapsible trailer frame 14 or disposed on a separate skid in certain embodiments. In other embodiments, the power unit 20 may be omitted. For example, a separate hydraulic or electric power skid may be coupled to the collapsible installation trailer 10 when the collapsible installation trailer 10 is operated. The collapsible installation trailer 10 may include two or more wheels 22 to enable the collapsible installation trailer 10 to be moved. The wheels 22 may be tires or continuous tracks to accommodate movement on different types of terrain. Further, certain embodiments may include appropriate wheels 22 to enable the installation trailer 10 be towed along roadways on the wheels 22.

In certain embodiments, the collapsible installation trailer 10 may include a re-rounding mechanism configured to re-round the deploying spoolable pipe 12. For example, the spoolable pipe 12 may have an oval cross-sectional shape when coiled. In other words, the spoolable pipe 12 may not have a circular cross-sectional shape. The re-rounding mechanism may use rollers or other components with circular or partially-circular shapes to re-shape the spoolable pipe 12 to have a circular or substantially circular cross-sectional shape when the rollers or other components are engaged with or pressed against the spoolable pipe 12. For example, the re-rounding mechanism may include one or more pairs of rollers located approximately 180 degrees apart from one another that engage with an outer surface of the spoolable pipe 12. Other types of re-rounding mechanisms and re-rounding techniques may also be used. For example, the re-rounding mechanisms may use a clamp or other device to push against some or all of the outer surface of the spoolable pipe 12.

In further embodiments, the collapsible installation trailer 10 may include one or more band cutters, which may include a cutting portion that is sharpened to be able to cut through bands of the coil. In certain embodiments, the band cutters may be made from multiple components to enable the cutting portion to be removed or replaced without having to remove or replace the entire band cutter. In further embodiments, the band cutters may be omitted and other techniques (e.g., manual band cutting) used to cut the bands.

Figure 2:
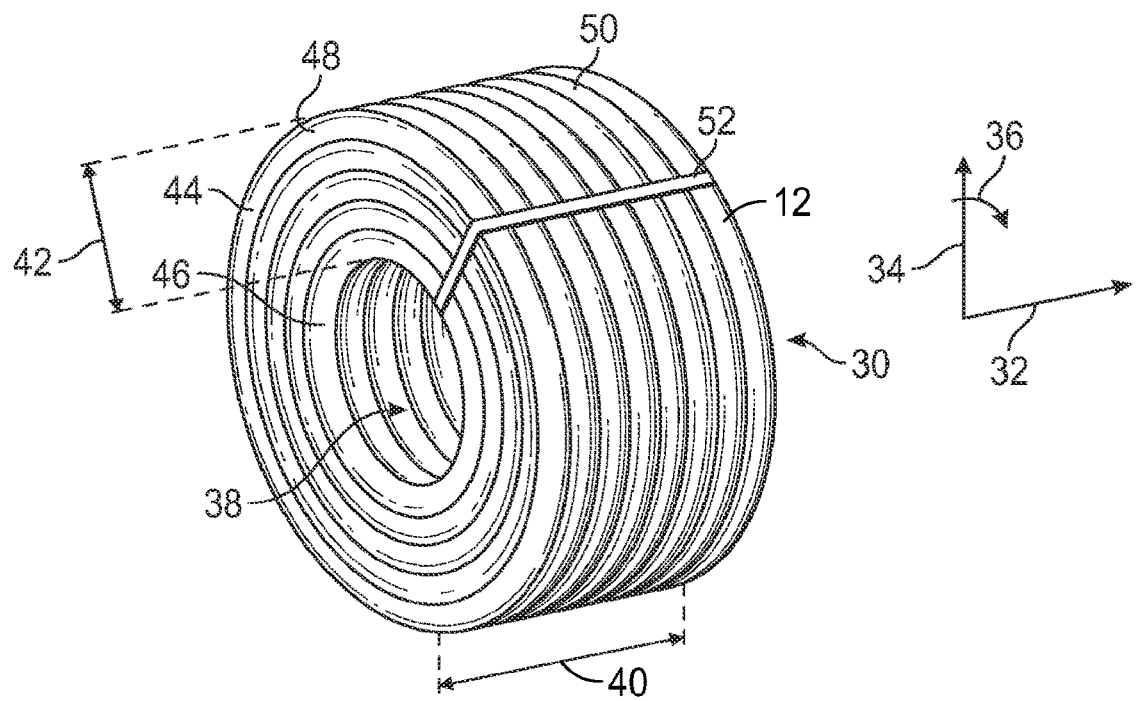
FIG. 2 is a perspective view of a coil of spoolable pipe according to embodiments of the present disclosure.

FIG. 2 illustrates a perspective view of an embodiment of a coil 30 of spoolable pipe 12. The coil 30 may be defined by an axial axis or direction 32, a radial axis or direction 34, and a circumferential axis or direction 36. The coil 30 may be formed by wrapping the spoolable pipe 12 into a coil with an interior channel 38 formed axially 32 therethrough, where the coil 30 may be moved as a single package or bundle of coiled pipe, as shown in FIG. 2. Each complete turn of coiled pipe may be referred to as a wrap of pipe. Multiple wraps of pipe in the coil 30 may be configured in columns along the axial direction 32 of the coil 30 and/or configured in layers along the radial direction 34 of the coil 30. For example, multiple columns of wraps may be formed along the axial direction 32 of the coil 30, where an axial dimension 40 of the coil 30 is based on the diameter of the pipe 12 and the number and axial 32 position of wraps forming the coil 30. Further, multiple layers of wraps may be formed along the radial direction 34 of the coil 30, where a radial dimension 42 of the coil 30 is based on the diameter of the pipe and the number and radial 34 position of the wraps forming the coil 30. In certain embodiments, a weight of the coil 30 may exceed 40,000 pounds (18,144 kilograms), 60,000 pounds (27,216 kilograms), or even 75,000 pounds (34,019 kilograms). As such, the collapsible trailer frame 14 and other components of embodiments of the collapsible installation trailer 10 may be configured to handle such coils 30 that other trailers not having the features of the collapsible installation trailer 10 cannot. For example, structural members of embodiments of the collapsible installation trailer 10 may be larger or heavier than ones used in other trailers. In one or more embodiments, the coil 30 may be disposed on a reel, which is further discussed below in FIG. 3.

As shown in FIG. 2, the coil 30 of spoolable pipe 12 may be one or more layers (e.g., layers 44 and 46) of pipe packaged or bundled into the coil 30. The coil 30 may include at least one or more layers of pipe that have been coiled into a particular shape or arrangement. As shown in FIG. 2, the coil 30 is coiled into a substantially cylindrical shape, where the axial dimension 40 of the coil 30 is measured between outer edges 48 and 50 of the coil 30.

As known to those of ordinary skill in the art, the spoolable pipe 12 used to make up the coil 30 shown in FIG. 2 may be coiled using spoolers or other coder machines suited for such a function. Those of ordinary skill will recognize that the present disclosure is not limited to any particular form of coder or other device that may be used to form pipe into a coil. Winding pipe into a coil, such as 30, assists when transporting pipe, which may be several hundred feet in length in one or more embodiments. Further, the coil 30 may be wound to facilitate deployment of the spoolable pipe 12. Deployment, as described above and used herein, may refer to the action of unspooling or unwinding the spoolable pipe 12 from the coil 30. The spoolable pipe 12 may be installed underground, above ground, or in water.

After being assembled into a coil, the coil 30 shown in FIG. 2 may include the interior channel 38 formed axially 32 through the coil 30. The interior channel 38 is a bore disposed generally in the center of the coil 30. The interior channel 38 may be substantially circular-shaped. The coil 30 may have an outer diameter (OD) and an inner diameter (ID), where the inner diameter is defined by the interior channel 38. As shown in FIG. 2, one or more bands 52 may be wrapped around the coil 30 to help prevent the coil 30 from unraveling. When the spoolable pipe 12 is deployed, the bands 52 may be cut at one or more desired locations using the band cutter described previously or a manual band cutter.

Figure 3:
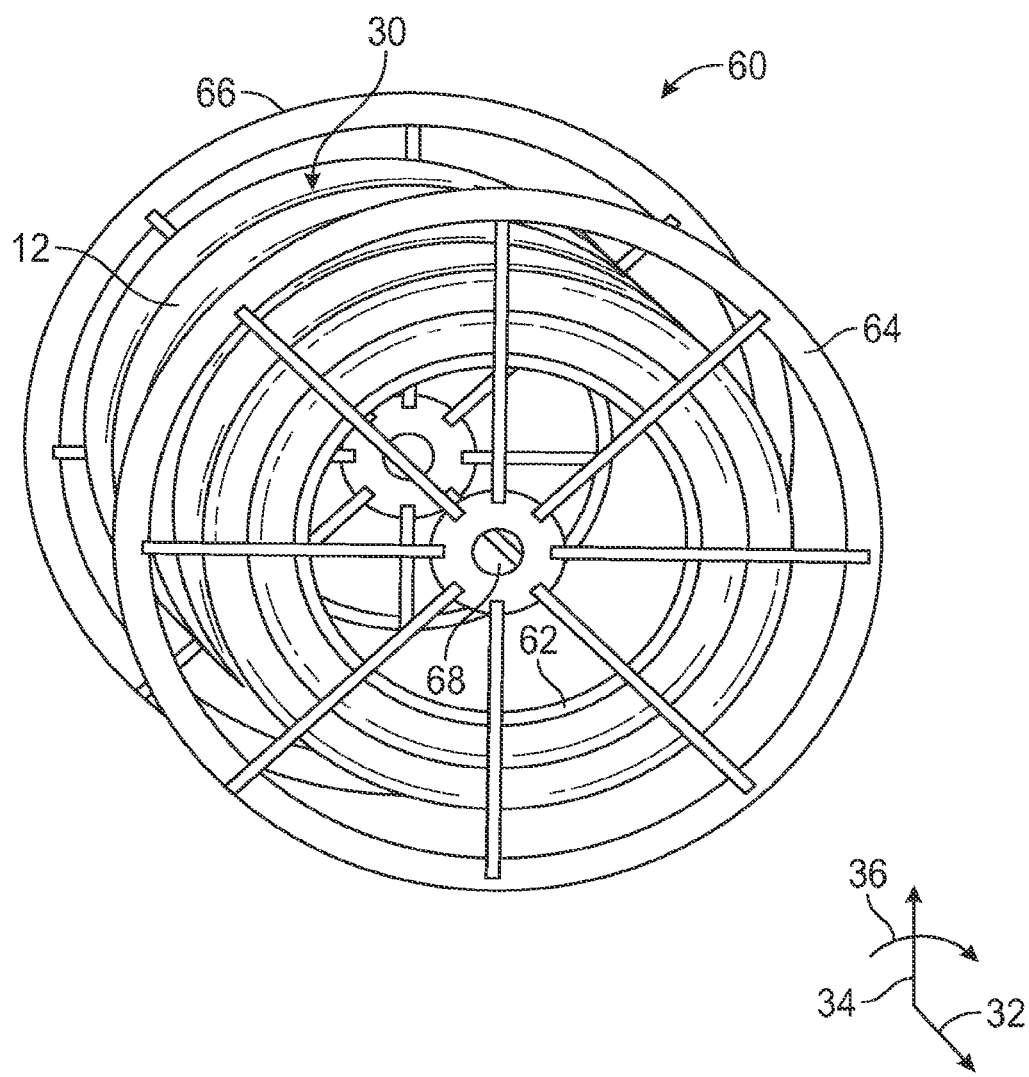
FIG. 3 is a perspective view of a reel of spoolable pipe according to embodiments of the present disclosure.

FIG. 3 illustrates a perspective view of an embodiment of a reel 60 of spoolable pipe 12. In some instances, the coil 30 of spoolable pipe 12 may be wound around the components of the reel 60, instead of transported as a bundled, freestanding package (e.g., as shown in FIG. 2). The coil 30 may be wound around the reel 60 such that the interior channel of the coil 30 is concentric with a central bore of the reel 60. A reel, as understood by those of ordinary skill, may include a cylindrical drum, such as cylindrical drum 62, around which layers of pipe may be wrapped to form the coil 30. The reel 60 may include two substantially circular reel ends 64 and 66 that are capable of turning about a shared axis. Accordingly, the reel ends 64 and 66 may be attached to the cylindrical drum 62.

As shown in FIG. 3, a bore 68 is disposed in each end 64 and 66 at a substantially central position. In addition, the bores 68 for each end 64 and 66 are substantially aligned with each other (and may also be aligned with a central axis of cylindrical drum 62). Spoolable pipe 12 (e.g. flexible pipe) may be wound around the cylindrical drum 62 using any means known to those of ordinary skill in the art.

Figure 4:
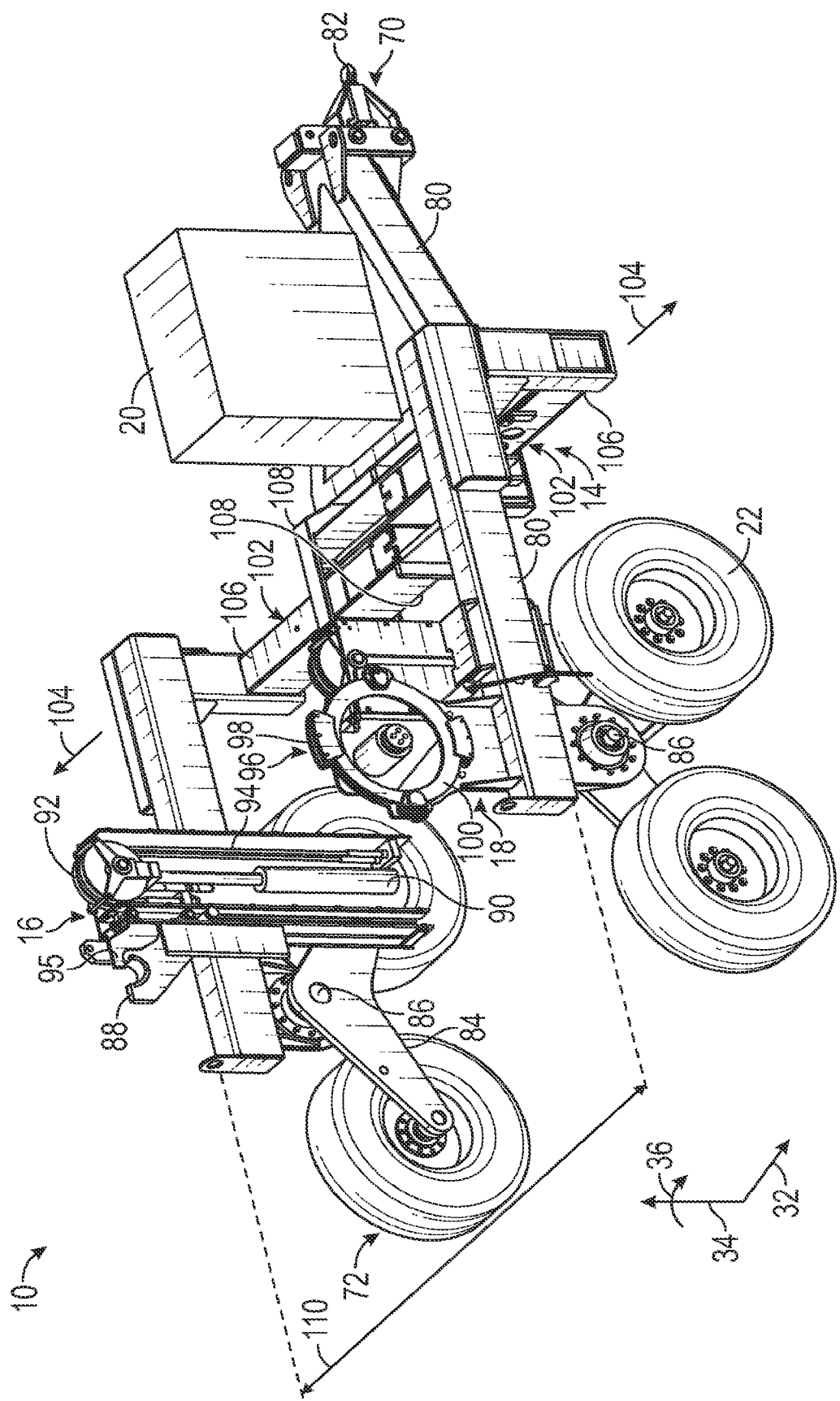
FIG. 4 is a perspective view of a collapsible installation trailer according to embodiments of the present disclosure.

FIG. 4 illustrates a perspective view of an embodiment of the collapsible installation trailer 10, which may have a front side 70 and a rear side 72. In the illustrated embodiment, the collapsible trailer frame 14 is made from several structural members 80 coupled to one another such that the collapsible trailer frame 14 may support the other components of the collapsible installation trailer 10 and the weight of the coil 30 or reel 60, which may exceed 40,000 pounds (18,144 kilograms), 60,000 pounds (27,216 kilograms), or 75,000 pounds (34,019 kilograms). For example, the structural members 80 may be made from square steel tubing, steel I-beams, sheet metal, or similar composite structural members. The collapsible trailer frame 14 may include a trailer connection point 82, which may be a hitch, such as a draw bar hitch. A draw bar hitch may be a type of tow hitch that includes a ball extending from a bar and configured to secure a hook or a socket combination for the purpose of towing or being towed. Those of ordinary skill in the art will appreciate that other types of tow hitches and attachment systems may be used to attach another vehicle to the collapsible installation trailer 10. In other embodiments, the trailer connection point 82 may be configured as a breakaway hitch so that electric brakes for the collapsible installation trailer 10 may be activated if the collapsible installation trailer 10 becomes disconnected from the tow vehicle for some reason.

Accordingly, a vehicle (not shown) may be fitted with a connector or attachment system known to those of ordinary skill in the art for connecting to the collapsible installation trailer 10. In one or more embodiments, a vehicle used to tow the collapsible installation trailer 10 may include without limitation, a dozer, a front-end loader, or excavator, for example, when the collapsible installation trailer 10 is fully loaded with the coil 30 or reel 60, or by standard trucks, automobiles, or other vehicles, for example, when the collapsible installation trailer 10 is in an unloaded state (i.e. is not carrying the coil 30 or reel 60). The collapsible installation trailer 10 may be further designed for off-road use by selecting wheels 22 appropriate for off-road use. In some embodiments, the wheels 22 may be wide base tires (e.g., super single tires) coupled to heavy duty hubs. Thus, the collapsible installation trailer 10 may be adapted for use with many types of roads and terrains. In the illustrated embodiment, the two wheels 22 on each side may be coupled to a frame 84 that tilts about a pivot 86 to enable the collapsible installation trailer 10 to move easily over uneven terrain. Although a total of four wheels 22 are shown in FIG. 4, other embodiments may include different numbers of wheels 22 (e.g., two, six, or more wheels 22) or track mechanisms. In certain embodiments, the collapsible installation trailer 10 is capable of deploying the spoolable pipe 12 by means of towing the collapsible installation trailer 10 along a pipeline path or keeping the collapsible installation trailer 10 stationary and pulling the spoolable pipe 12 off the collapsible installation trailer 10.

As shown in FIG. 4, the lifting mechanism 16 may be used to raise and lower coils 30 or reels 60 with the use of two "j-shaped" hooks 88. The lifting hooks 88 may be raised and lowered by use of hydraulic cylinders 90 capable of lifting or lowering coils 30 or reels 60 that may exceed 40,000 pounds (18,144 kilograms), 60,000 pounds (27,216 kilograms), or 75,000 pounds (34,019 kilograms). In certain embodiments, the hydraulic cylinders 90 may be coupled directly to the lifting hooks 88. In other embodiments, the hydraulic cylinders 90 may be coupled indirectly to the lifting hooks 88. For example, one or more sheaves 92 or pulleys and an appropriate belt 94, rope, wire, cable, chain, or other tension bearing member used to provide mechanical advantage and/or redirect the direction of motion of the hydraulic cylinders 90. In certain embodiments, the lifting mechanism 16 may have a 2:1 ratio, a 3:1 ratio, or better. As shown in FIG. 4, the lifting mechanism 16 is configured to move the lifting hooks 88 and the corresponding coil 30 or reel 60 in a perpendicular direction to the axial axis 32 (e.g., vertically). In other embodiments, the lifting mechanism 16 may be disposed at an angle to the axial axis 32, thereby moving the coil 30 or reel 60 at an angle to the horizontal direction. In further embodiments, the lifting hooks 88 may have shapes other than a "j-shape." For example, each lifting hook 88 may have a circular opening to accommodate a shaft used to manipulate the coil 30 or reel 60. In further embodiments, a rack and pinion gear, hand crank with gears, or other mechanical or electrical device or actuator may be used instead of hydraulic cylinders 90 in the lifting mechanism 16.

In certain embodiments, a vertical stop 95 may be used with the lifting hook 88. When a shaft or similar portion of the reel 60 or a device used to manipulate coils 30 is located in the lifting hook 88 and the lifting hook 88 is raised toward the vertical stop 95 by the lifting mechanism 16, the vertical stop 95 may be used to block the shaft from inadvertently coming or falling out of the lifting hook 88, for example if the installation trailer 10 were to encounter a bump during movement or deployment of the spoolable pipe 12. Thus, the vertical stop 95 provides this safety feature without having an operator climb onto the installation trailer 10 or use a ladder to install or move a similar safety retainer into place. Instead, the vertical stop 95 provides this feature when the lifting mechanism 16 is in the deployment position (e.g., when the lifting hook 88 is located at its topmost position). In other embodiments, the vertical stop 95 may be coupled to the lifting hook 88 and move vertically together with the lifting hook 88. In such embodiments, the vertical stop 95 may be coupled to the lifting hook 88 via a hinge or similar connection to enable the vertical stop 95 to be moved into an appropriate position to block undesired movement of the shaft.

In the illustrated embodiment, the braking mechanism 18 may include a caliper brake 96 that includes one or more calipers 98 disposed against a rotor 100, which may be coupled to the lifting mechanism 16. The caliper brake 96 may be used to slow or stop rotation of the coil 30 or reel 60 during deployment, thereby helping to prevent undesired unspooling, free-spooling, or backlash of the spoolable pipe 12. Those of ordinary skill in the art will appreciate that other types of braking mechanisms, such as, but not limited to, frictional brakes, disc brakes, drum brakes, electromagnetic brakes, or hydraulic motors, may be used to provide braking of the coil 30 or reel 60. In some embodiments, the braking mechanism 18 may be configured to provide braking for reels 60. For example, the braking mechanism 18 may grip or directly contact the reel 60 to provide the braking force. Thus, the braking mechanism 18 applies pressure to the reel 60. In further embodiments, a motor or similar device may be added to the braking mechanism 18 or to the installation trailer 10 to provide respool capability. In other words, the motor may rotate the coil 30 or reel 60 in an opposite direction to that used during deployment to respool some or all of the deployed spoolable pipe 12 back onto the coil 30 or reel 60.

In the illustrated embodiment, the hydraulic power unit 20 may be coupled to the trailer frame 14 near the trailer connection point 82. For example, the hydraulic power unit 20 may include an electric-start gasoline or diesel engine, 2-stage hydraulic pump, hydraulic fluid reservoir, and gasoline reservoir configured to provide hydraulic power to the hydraulic components of the installation trailer 10, such as the hydraulic cylinders 90 of the lifting mechanism 14, the breaking mechanism 18, or other hydraulic cylinders described below. In some embodiments, the hydraulic power unit 20 may be replaced by an electric power supply and the hydraulic cylinders replaced by various types of electromechanical actuators.

Figure 6:
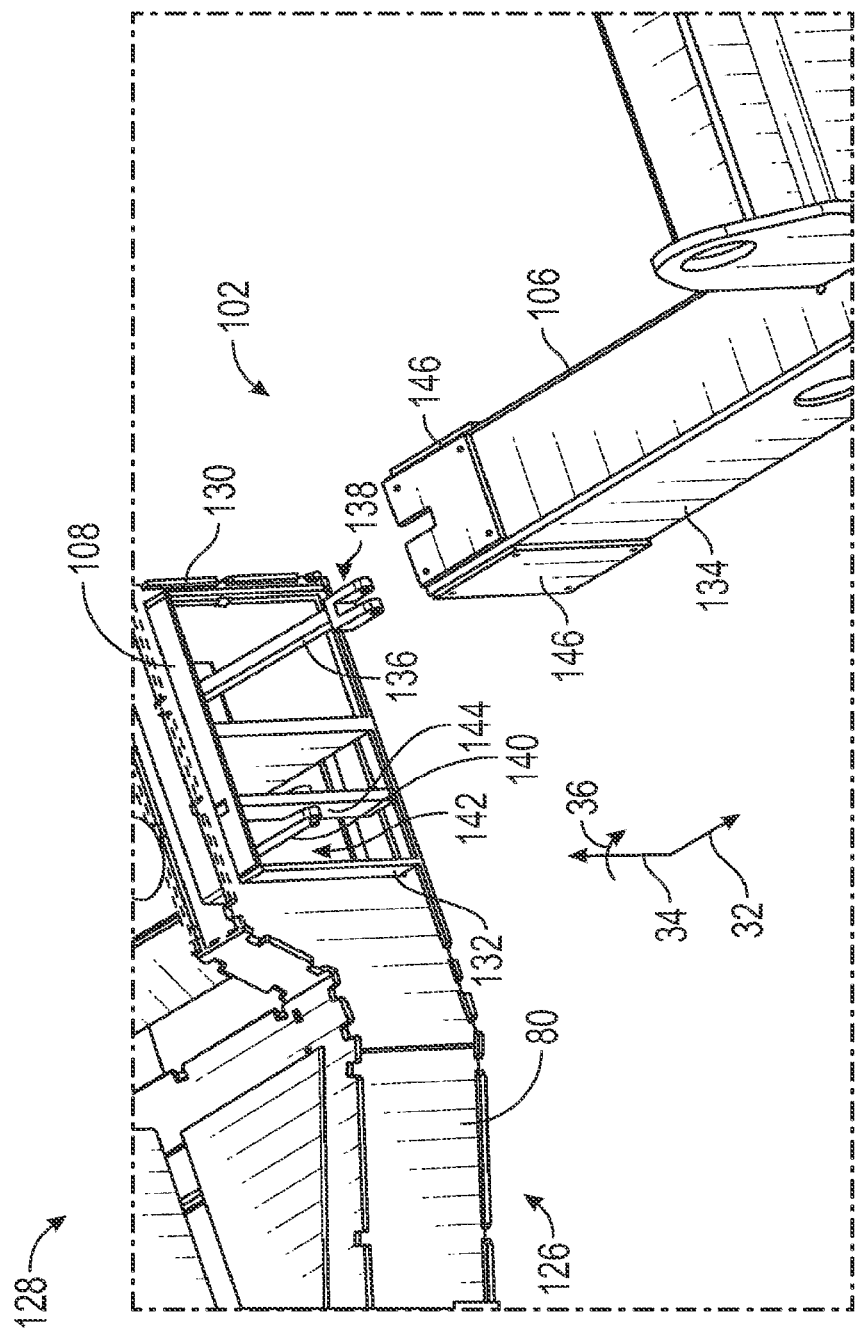
FIG. 6 is a perspective view of telescoping sides of a collapsible installation trailer according to embodiments of the present disclosure.

In certain embodiments, the installation trailer 10 may include telescoping sides 102 configured to move in the direction of arrows 104 via one or more hydraulic cylinders disposed within the structural members 80 (as shown in FIG. 6) or coupled externally to the structural members 80. In other words, inner structural members 106 may have a smaller dimension (e.g., width, height, or diameter) than outer structural members 108 to enable the inner structural members 106 to slide in or out of the outer structural members 108. One end of the hydraulic cylinders may be coupled to the inner structural member 106 and another end coupled to the outer structural member 108 to provide the motive force to move the inner structural members 106. In other embodiments, the hydraulic cylinders may be omitted and an operator may manually move the inner structural members 106 in or out of the outer structural members 108. In further embodiments, a rack and pinion gear, hand crank with gears, or other mechanical or electrical device or actuator may be used to move the inner structural members 106 telescopically. As shown in FIG. 4, the installation trailer 10 has an expanded system width 110. In other words, the telescoping sides 102 enable the inner structural members 106 to move outward in the direction of arrows 104 to the expanded system width 110. The installation trailer 10 may be able to accommodate coils 30 or reels 60 when in the expanded position that would not be possible when the installation trailer 10 is in a collapsed position, as described below. In further embodiments, other techniques may be used to accomplish expanding or contracting the installation trailer 10, such as, but not limited to, hinges, joints, disassembly/reassembly, folding, expansion joints, accordion joints, and so forth. In further embodiments, one or more structural members 80 may be disposed at the rear side 72 between lengthwise structural members 80 to provide additional structural stability to the installation trailer 10. The additional structural members 80 may couple together telescopically or swing toward or away from the installation trailer 10 via hinges like a gate.

Figure 5:
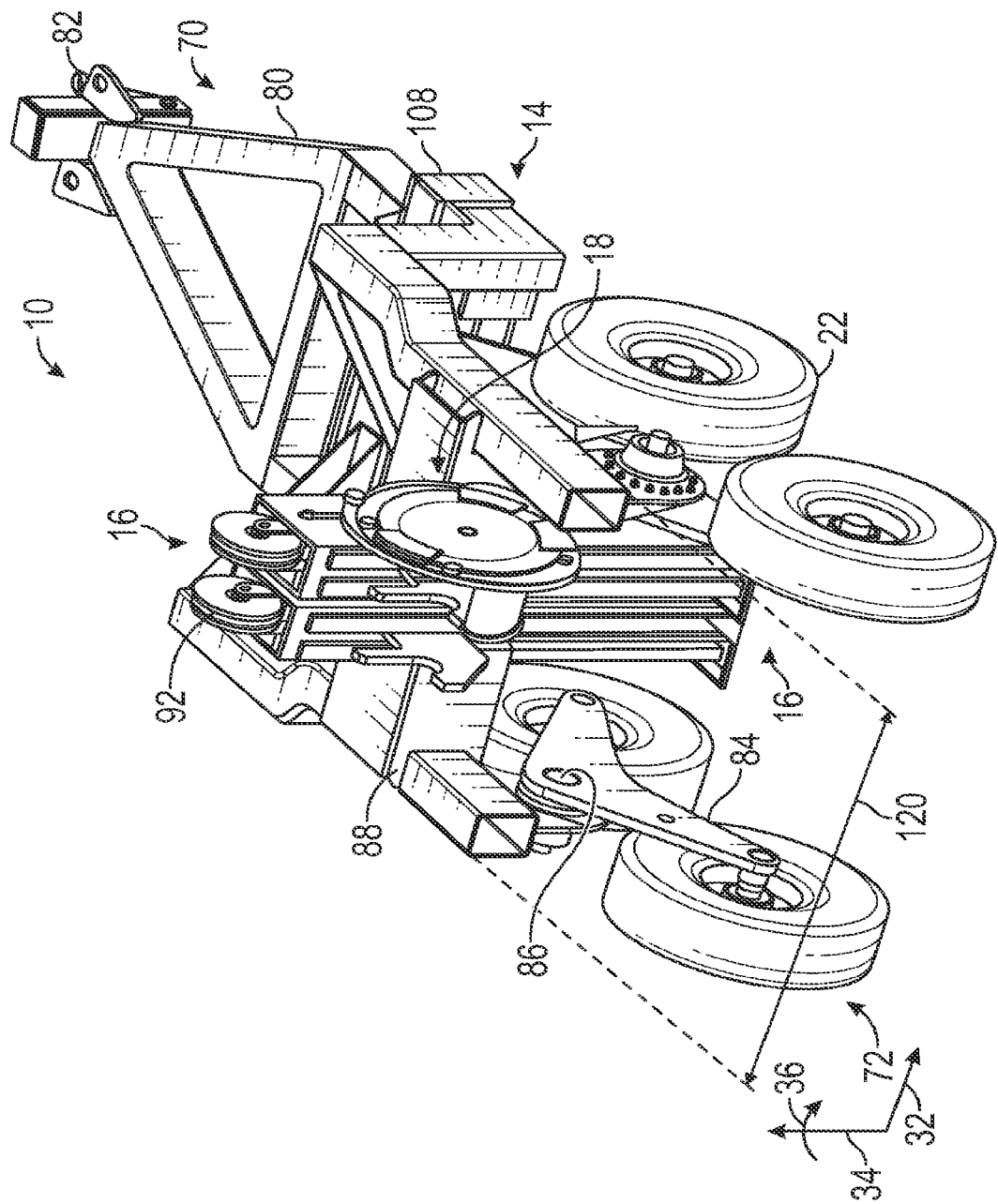
FIG. 5 is a perspective view of a collapsible installation trailer in a collapsed configuration according to embodiments of the present disclosure.

FIG. 5 illustrates a perspective view of an embodiment of the installation trailer 10 in a collapsed position, such that a collapsed system width 120 is less than the expanded system width 110 shown in FIG. 4. The hydraulic power unit 20 has been removed for clarity. As shown in FIG. 5, the inner structural members 106 (not visible in FIG. 5) are fully inserted into the outer structural members 108 via hydraulic cylinders disposed in or coupled to the inner structural members 106. The two lifting mechanisms 16 may be disposed adjacent to each other when the installation trailer 10 is in the collapsed position, thereby improving the compactness of the collapsed trailer 10. Thus, when the installation trailer 10 is in the collapsed position, the trailer 10 can be more easily and economically shipped or transported to the deployment site.

FIG. 6 illustrates a perspective view of an embodiment of the telescoping sides 102 of the installation trailer 10, with a left side 126 and a right side 128 (referring to left and right sides of the installation trailer 10). Portions of two outer structural members 108 are shown in FIG. 6, namely a left outer structural member 130 (with an opening to the left side 126) and a right outer structural member 132 (with an opening to the right side 128). A left inner structural member 134 is shown pulled out of the left outer structural member 130. A portion of a left hydraulic cylinder 136 is shown inside the left outer structural member 130. The left hydraulic cylinder 136 has a first end 138 that is configured to couple with an internal support (not shown) of the left inner structural member 134. When the left hydraulic cylinder 136 is contracted, it pulls the left inner structural member 134 further into the left outer structural member 130. Alternatively, when the left hydraulic cylinder 136 is extended, it pushes the left inner structural member 134 further out of the left outer structural member 130. A portion of a right hydraulic cylinder 140 is shown inside the right outer structural member 132. A covering of the right outer structural member 132 has been omitted to enable the right hydraulic cylinder 140 to be visible in FIG. 6. The right hydraulic cylinder 140 has a second end 142 that is configured to couple with an internal support 144 of the right outer structural member 132. The right hydraulic cylinder 140 works in a similar manner to the left hydraulic cylinder 136 to extend or retract the right inner structural member (not shown) from the right outer structural member 132. The left inner structural member 134 moves in an opposite direction from the right inner structural member (not shown) when the installation trailer 10 is expanded or collapsed. In certain embodiments, the left inner structural member 134 may include one or more pads 146 to reduce friction between the left inner structural member 134 and left outer structural member 130. The pads 146 may be made from a low-friction polymer or similar material. The pads 146 may also be made of steel or another metal or metal alloy and be configured to be replaced when worn, thereby helping to prevent excessive wear of the inner structural members. Additionally or alternatively, the left outer structural member 130 may include similar pads on one or more internal surfaces of the left outer structural member 130. The right inner structural member (not shown) and/or the right outer structural member 132 may also include one or more pads 146. In other embodiments, the hydraulic cylinders 136 and 140 may be configured differently. For example, the hydraulic cylinders 136 and 140 may be disposed outside of the left and right outer structural members 130 and 132. In further embodiments, a single hydraulic cylinder may be used instead of two cylinders 136 and 140.

Figure 7:
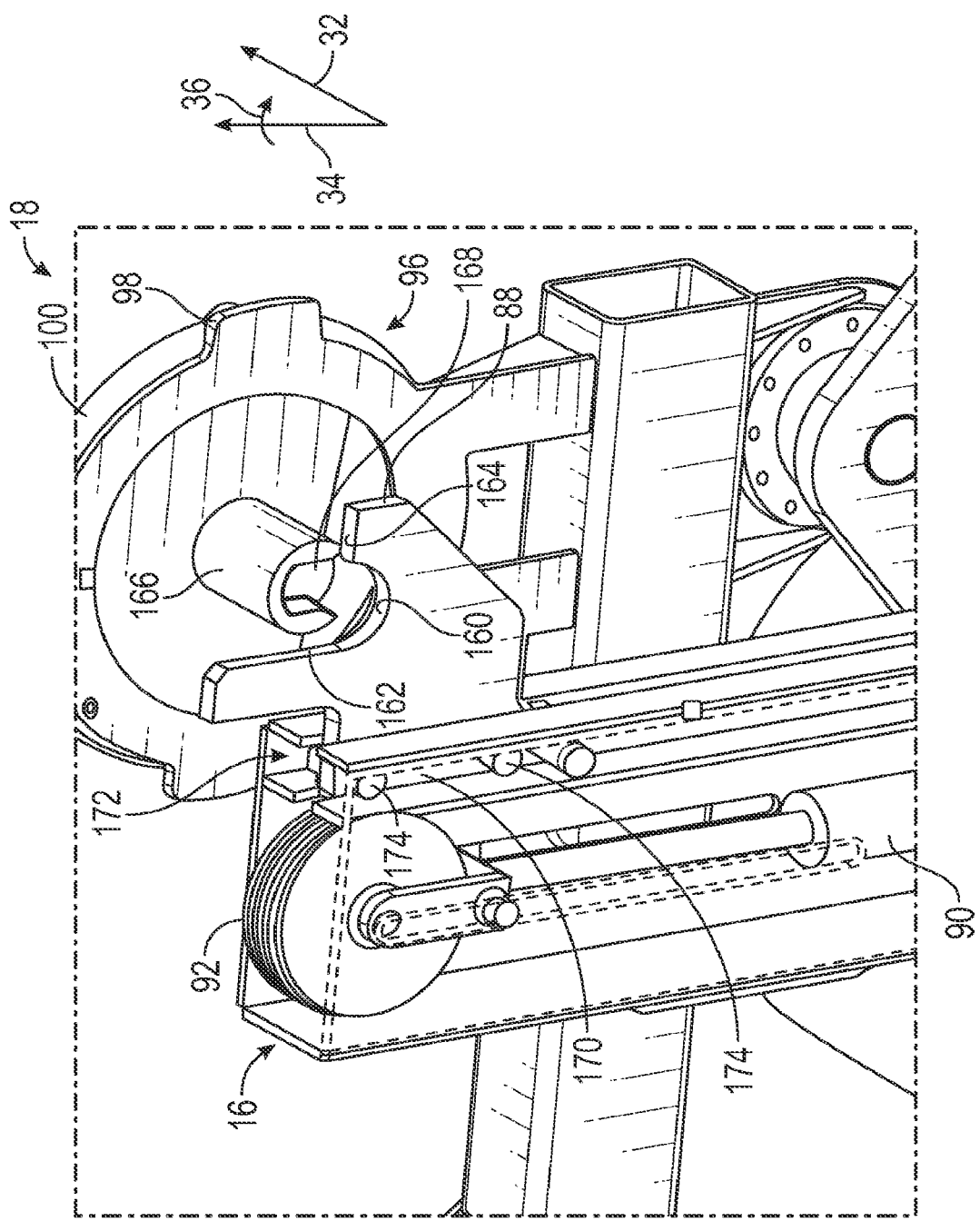
FIG. 7 is a perspective view of a lifting mechanism and a braking mechanism according to embodiments of the present disclosure.

FIG. 7 illustrates a perspective view of an embodiment of the lifting mechanism 16 and the braking mechanism 18. Portions of the lifting mechanism 16, such as external covers, are omitted in FIG. 7 to enable internal components to be visible. As shown in FIG. 7, the lifting hook 88 includes a first surface 160 and a second surface 162. The first surface 160 may be curved to generally correspond with a shaft diameter or similar portion of the reel 60 or a device used to manipulate coils 30, as described in more detail below. The first surface 160 may be made of a material that is harder, more durable, or provides a lower coefficient of friction when in sliding contact with the shaft than the material used for the rest of the lifting hook 88 to reduce wear caused by friction when the shaft rotates during deployment of the spoolable pipe 12. In certain embodiments, an insert may be added to the first surface 160 and the insert may be made of an appropriate wear-resistant material, such as, but not limited to, alloys of aluminum bronze, aluminum copper, nickel aluminum bronze, manganese bronze, and so forth. By using an insert for the first surface 160, the insert may be replaced without having to replace the entire lifting hook 88. The second surface 162 may be generally oriented perpendicular to the axial axis 32, thereby acting as a stop to the shaft used with coils 30 or reels 60. For example, the installation trailer 10 may be moved toward the coil 30 or reel 60 until the shaft reaches the second surface 162. At that point, the shaft is in the proper position with respect to the first surface 160 (i.e., directly above the first surface 160) and the lifting hook 88 may be raised by the lifting mechanism 16 to engage with the shaft. When deployment is complete, the lifting hook 88 may be lowered by the lifting mechanism 16 until the shaft can clear a lip 164 of the lifting hook 88. The lip 164 may help prevent the shaft from inadvertently coming out of the lifting hook 88. In certain embodiments, the lifting hook 88 may be coupled to the belt 94 via a trolley 170 or similar mechanism that moves within a track 172 of the lifting mechanism 16. The trolley 170 may include one or more wheels 174, low-friction surfaces, or both to enable free movement of the lifting hook 88.

When the shaft is raised by the lifting mechanism 16, the shaft will engage with a brake shaft 166 coupled to the rotor 100 of the caliper brake 96. The brake shaft 166 may include a keyed opening 168 configured to engage or mate with a corresponding shape of the shaft. For example, both the shaft and the keyed opening 168 may include one or more flat (i.e., non-curved) sides or surfaces to prevent rotation of the shaft within the keyed opening 168. Thus, rotation of the shaft causes rotation of the brake shaft 166 and rotor 100. In addition, the keyed opening 168 enables the brake shaft 166 to engage with the shaft without having to move the brake shaft 166 and rotor 100 axially 32 (i.e., inwardly or outwardly with respect to the shaft). Before the shaft is engaged with the braking mechanism 18, the rotor 100 and brake shaft 166 may be rotated such that the keyed opening 168 is facing in a downward direction toward the shaft so the shaft can enter the keyed opening 168. When deployment is complete, the rotor 100 may be rotated such that the keyed opening 168 is facing again in the downward direction toward the shaft so the shaft can exit from the keyed opening 168. In other embodiments, different techniques may be used to temporarily couple the shaft to the braking mechanism 18, such as, but not limited to, screws, bolts, pins, threads, and so forth. Further, although the brake shaft 166 is shown in FIG. 7 coupled to the caliper brake 96, the brake shaft 166 and lifting hook 88 may be used with other types of braking mechanisms 18. In some embodiments, the keyed opening 168 may have a socket or circular shape instead of the open shape shown in FIG. 7. In such embodiments, the brake shaft 166, or the shaft used with the coil 30 or reel 60, or both the brake shaft 166 and shaft are moved axially 32 to engage the shaft with the keyed opening 168.

Figure 8:
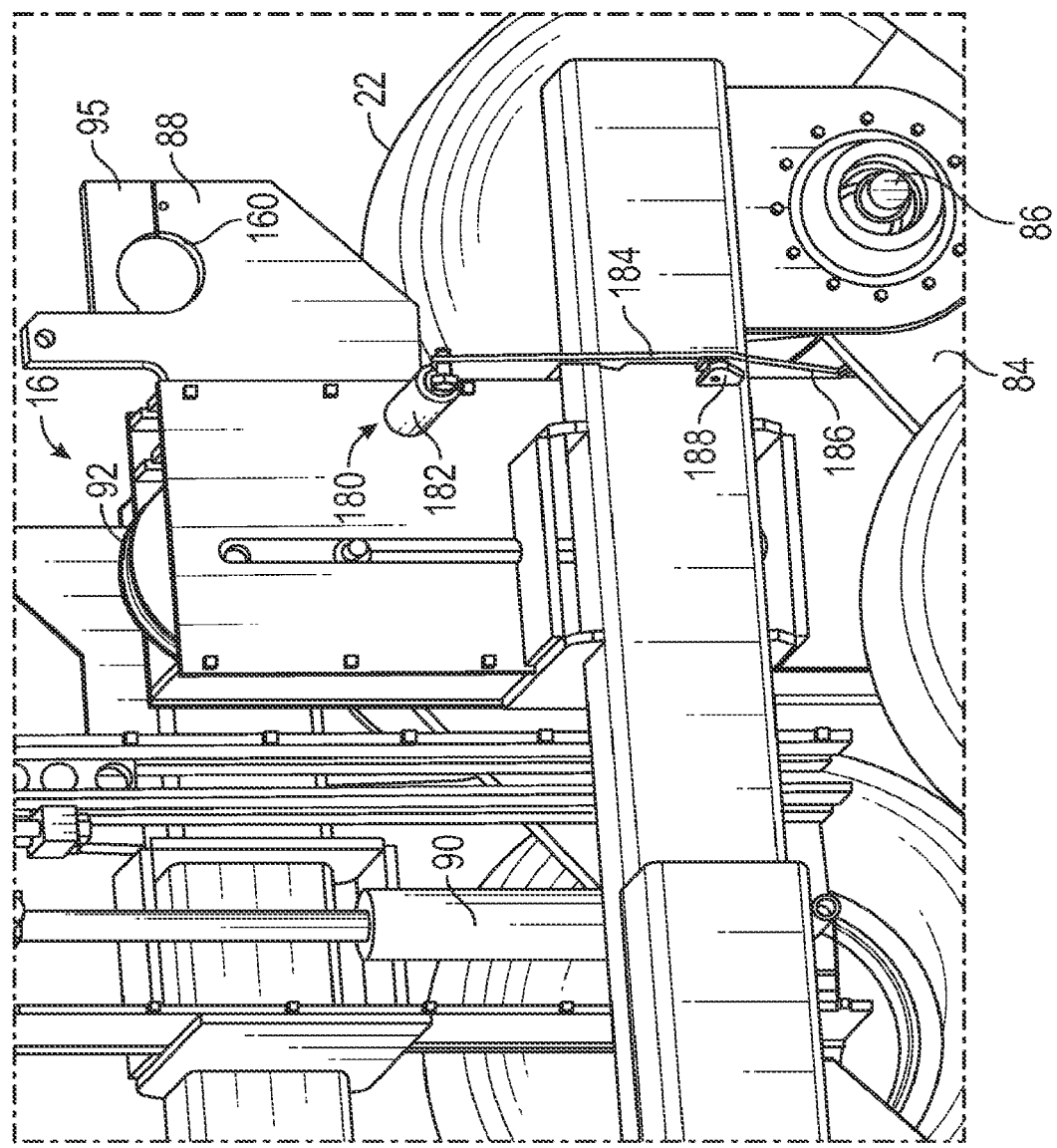
FIG. 8 is a perspective view of a lifting mechanism that includes a mechanical lockout according to embodiments of the present disclosure.

FIG. 8 illustrates a perspective view of an embodiment of the lifting mechanism 16 that includes a mechanical lockout 180. As shown in FIG. 8, the mechanical lockout 180 includes a plunger 182, a lever 184, a handle 186, and a pivot 188. The mechanical lockout 180 is configured to mechanically lock the lifting hook 88 into the raised position without relying alone on the hydraulic cylinders 90. Thus, the mechanical lockout 180 improves the safety associated with operation of the installation trailer 10 by reducing the possibility of the coil 30 or reel 60 falling and reducing the number of pinch points. When lockout of the lifting hook 88 is desired, an operator pulls on the handle 186 in an outward direction (i.e., away from the installation trailer 10), which causes the lever 184 to push the plunger 182 inward (i.e., toward the installation trailer 10) via the pivot 188 thereby engaging the plunger 182 with an opening formed in the lifting hook 88 (not shown). The lever 184 enables the operator to engage the plunger 182 from ground level without having to climb onto the installation trailer 10 to reach the plunger 182. In certain embodiments, the plunger 182 may include a proximity switch (not shown) to indicate that the plunger 182 has properly engaged with the opening in the lifting hook 88. Thus, the operator may be able to receive a signal from the proximity switch to verify proper engagement of the mechanical lockout 180 without having to climb onto the installation trailer 10. In further embodiments, other types of mechanical or electrical lockouts may be provided on the installation trailer 10 to prevent inadvertent movement of the lifting hook 88.

Figure 9:
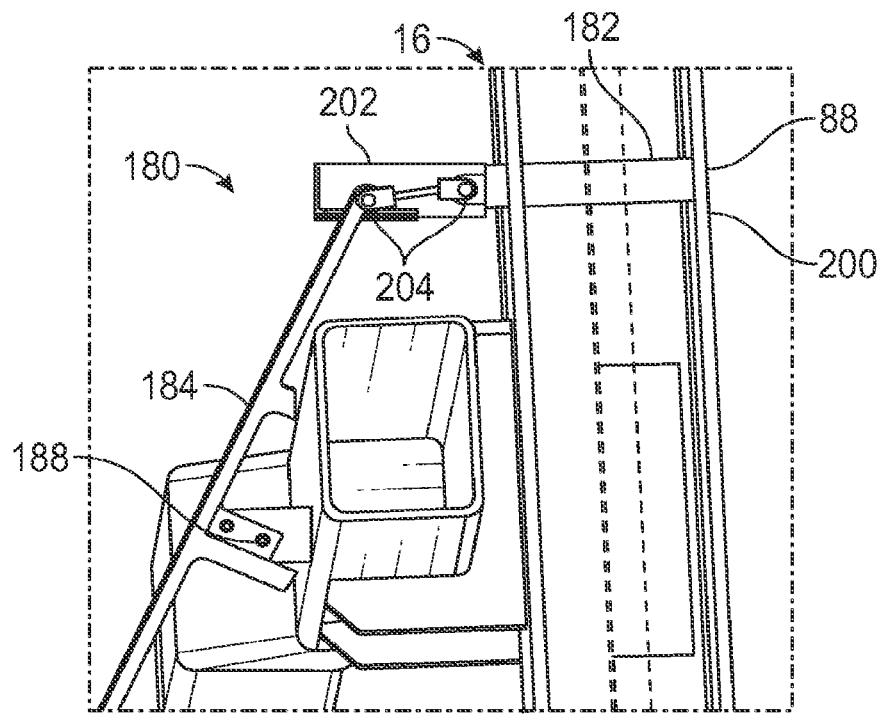
FIG. 9 is a side view of a mechanical lockout in an engaged position according to embodiments of the present disclosure.

FIG. 9 illustrates a side view of an embodiment of the mechanical lockout 180 in an engaged position. As shown in FIG. 9, the lever 184 has been pushed toward the lifting mechanism 16 and has rotated about the pivot 188. The plunger 182 coupled to the end of the lever 184 has been pushed inward to engage with an opening 200 in the lifting hook 88. In addition, the plunger 182 is disposed in a sleeve 202 coupled to the lifting mechanism 16. One or more hinges 204 may be provided in the mechanical lockout 180 to achieve a desired range of motion.

Figure 10:
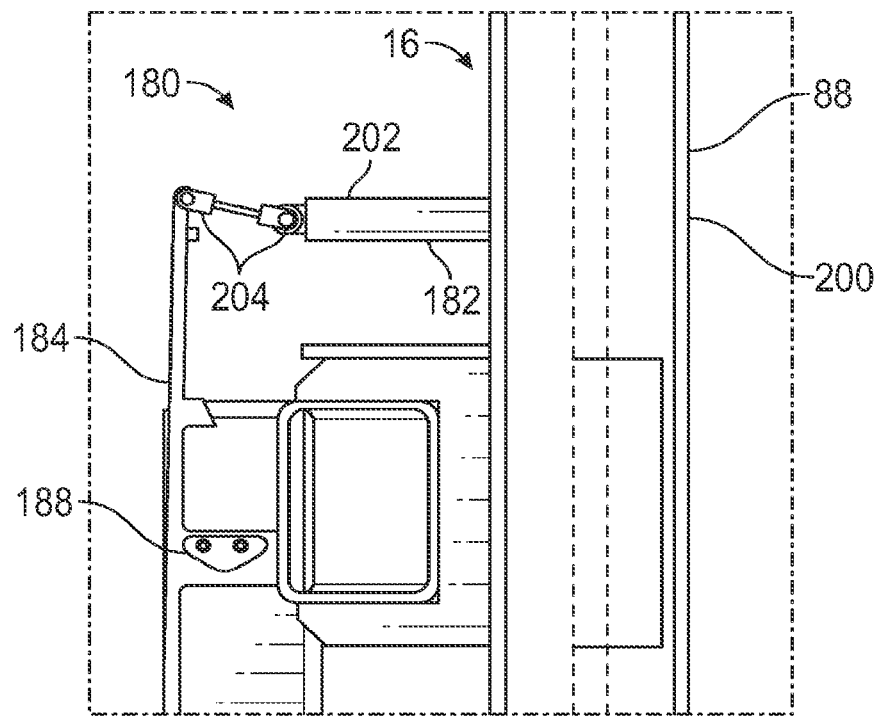
FIG. 10 is a side view of a mechanical lockout in a disengaged position according to embodiments of the present disclosure.

FIG. 10 illustrates a side view of an embodiment of the mechanical lockout 180 in a disengaged position. As shown in FIG. 10, the lever 184 has been pushed away from the lifting mechanism 16 and has rotated about the pivot 188. The plunger 182 coupled to the end of the lever 184 has been pulled into the sleeve 202 and no longer engages with the opening 200 in the lifting hook 88. Thus, the lifting hook 88 is free to move vertically via the hydraulic cylinder 90. In certain embodiments, the lifting hook 88 may not include the opening 200 and may instead include an additional feature (e.g., a socket) for the plunger 182 to engage with.

Figure 11:
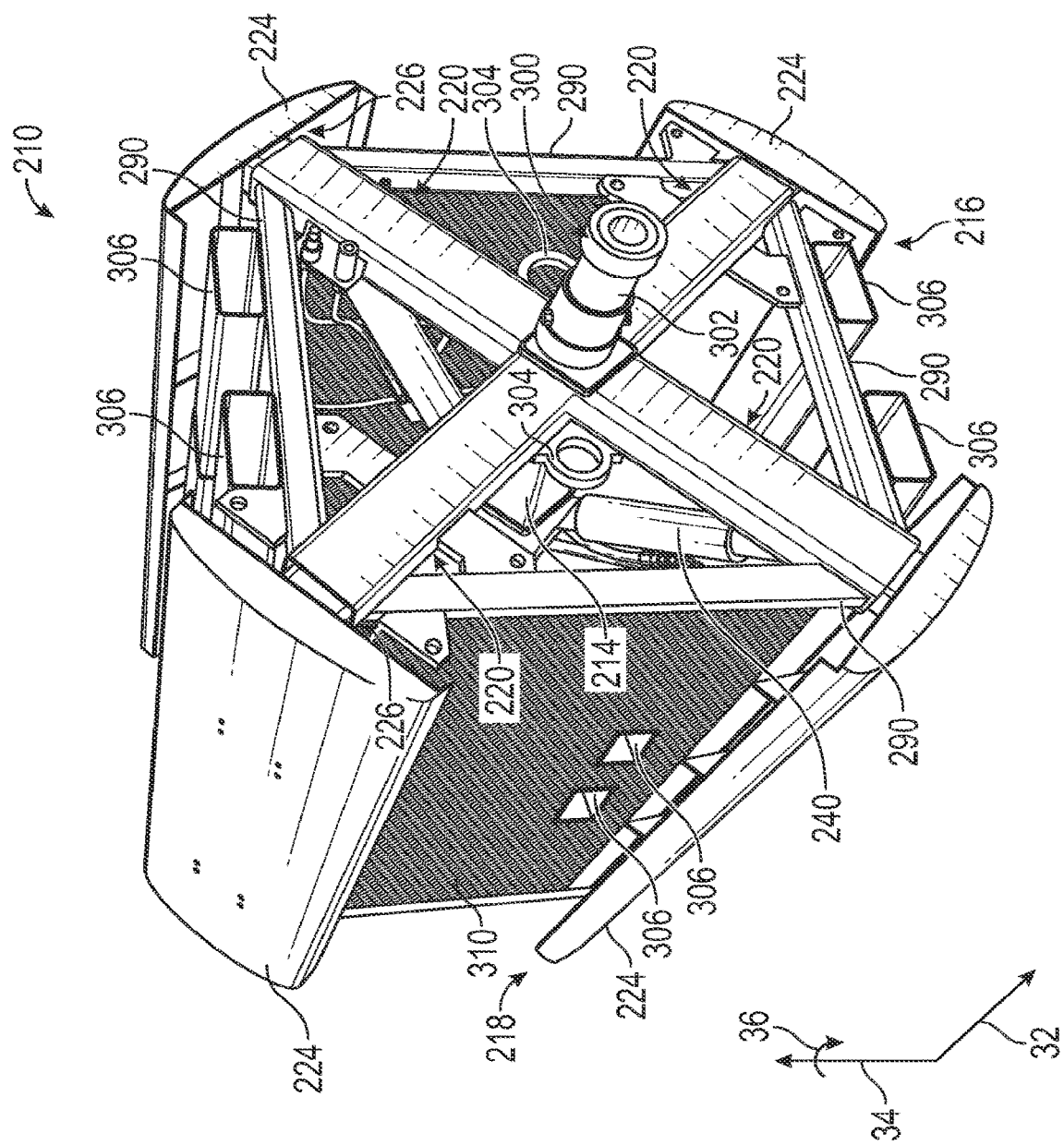
FIG. 11 is a perspective view a drum assembly that may be used to manipulate coils according to embodiments of the present disclosure.

FIG. 11 illustrates a perspective view of an embodiment of a drum assembly 210 that may be used to manipulate coils 30. The drum assembly 210 may include a support bar 214 having a first end 216 and a second end 218 that extends axially 32 through the center of the drum assembly 210. The support bar 214 is used to handle the drum assembly 210 and various components are coupled to the support bar 214, as described in further detail below. In certain embodiments, a first plurality of expandable spokes 220 are coupled to the support bar 214 proximate the first end 216 and a second plurality of expandable spokes (not shown) are coupled to the support bar 214 proximate the second end 218. In addition, each of a plurality of drum segments 224 are mounted to a distal end 226 of one of the first plurality of expandable spokes 220 and a distal end of one of the second plurality of expandable spokes. The drum segments 224 extend parallel to the support bar 214. The plurality of drum segments 224 are used to support the spoolable pipe 12 and the distal end 226 of the first plurality of expandable spokes 220 and the distal end of the second plurality of expandable spokes are movable between retracted and extended positions via one or more mechanical actuators 240. Thus, the drum assembly 210 is configured to be easily inserted, expanded outward to support, then manipulate the coils 30, and withdrawn from coils 30 of spoolable pipe 12 and to be used with coils 30 of spoolable pipe 12 of different inner coil diameters. The mechanical actuators 240 can be connected to and powered by the hydraulic power unit 20 when used with the installation trailer 10.

In certain embodiments, a first hub 300 is disposed at the first end 216 and the first hub 300 includes a first hub shaft 302, which may have a circular cross-sectional shape. Although not shown in the perspective view of FIG. 11, the drum assembly 210 may also include a second hub and second hub shaft disposed at the second end 218 similar to the first hub 300 and first hub shaft 302. In certain embodiments, the first hub 300 and second hub may be referred to as integrated hubs because the first hub 300 and second hub may eliminate the use of a hollow support bar with open ends along the axial axis 32 of the drum assembly 210 for inserting a rod or pole for lifting and deploying the drum assembly 210. Instead, integrated hubs such as the first hub 300 and the second hub may act together with the support bar 214 as a fixed axle with respect to the drum assembly 210. In addition, the first hub shaft 302 and second hub shaft may provide fixed locations for an operator to grab or manipulate the drum assembly 210, such as with a forklift, without using a rod, pole, or other similar lifting equipment.

In particular, the first hub 300 and second hub can be used to handle and move the drum assembly 210. In addition, when the drum assembly 210 is placed in an appropriate frame, trailer, or other deployment device, such as the installation trailer 10, the first hub shaft 302 and second hub shaft may be used to enable rotation of the drum assembly 210. In other words, the first hub shaft 302 and second hub shaft may fit within a circular or partially circular opening or bearing surface of the frame, trailer, or other deployment device to allow the drum assembly 210 to rotate. One example of such an opening is the lifting hook 88 of the installation trailer 10. Thus, the first hub shaft 302 and second hub shaft may contact the first surface 160 or insert of the first surface 160 of the lifting hook 88 during deployment. In addition, the first hub 300 and second hub may be shaped to match the keyed opening 168 of the brake shaft 166 of the braking mechanism 18. Thus, the braking mechanism 18 applies pressure to the drum assembly 210 having the coil 30. In certain embodiments, one or more pad-eyes 304 may be disposed at the first and second ends 216 and 218 to enable handling of the drum assembly 210. For example, straps, ropes, chains, or similar securement devices may be coupled to the pad-eyes 304 to facilitate movement of the drum assembly 210. The pad-eyes 304 may be coupled to the support bar 214, expandable spokes 220, spoke frames 290, or other appropriate locations of the drum assembly 210. In further embodiments, the drum assembly 210 may include at least two fork channels 306 that extend axially 32 or radially 34 along the support bar 14. The forks or tines of a forklift, truck, or similar machinery may be inserted into the fork channels 306 to enable lifting and moving the drum assembly 210. For example, fork channels 306 that extend axially 32 may be used to insert and remove the drum assembly 210 from the interior channel 38 of the coil 30. Fork channels 306 that extend radially 34 may be used to lift or set the drum assembly 210 from or on a truck, railcar, or similar transportation or used when access to the fork channels 306 extending axially 32 is limited or restricted. The fork channels 306 may be coupled to the support bar 214, expandable spokes 220, spoke frames 290, or other appropriate locations of the drum assembly 210.

In certain embodiments, the drum assembly 210 may include a cage 310 that at least partially covers one or more components of the drum assembly 210. For example, the cage 310 may help to protect components of the drum assembly 210 when the drum assembly 210 is moved or handled via the fork channels 306. The cage 310 may be made from expanded metal or mesh and coupled to the support bar 214, expandable spokes 220, spoke frames 290, fork channels 306, or other appropriate locations of the drum assembly 210. In further embodiments, the drum assembly 210 may include a plurality of extension arms, flanges, cages, or so forth at the first and second ends 16 and 18 to help contain the coil 30 during deployment of the spoolable pipe 12. Although one embodiment of a drum assembly 210 that may be used with the installation trailer 10 is shown in FIG. 11, other embodiments of the drum assembly 210 with different, additional, or fewer features may also be used with the installation trailer 10. For example, the drum assembly 210 may have a different number or arrangement of drum segments 224, the cage 310 may be omitted, additional containment arms or flanges may be located at one or both of the first and second ends 216 and 218, and so forth.

Figure 12:
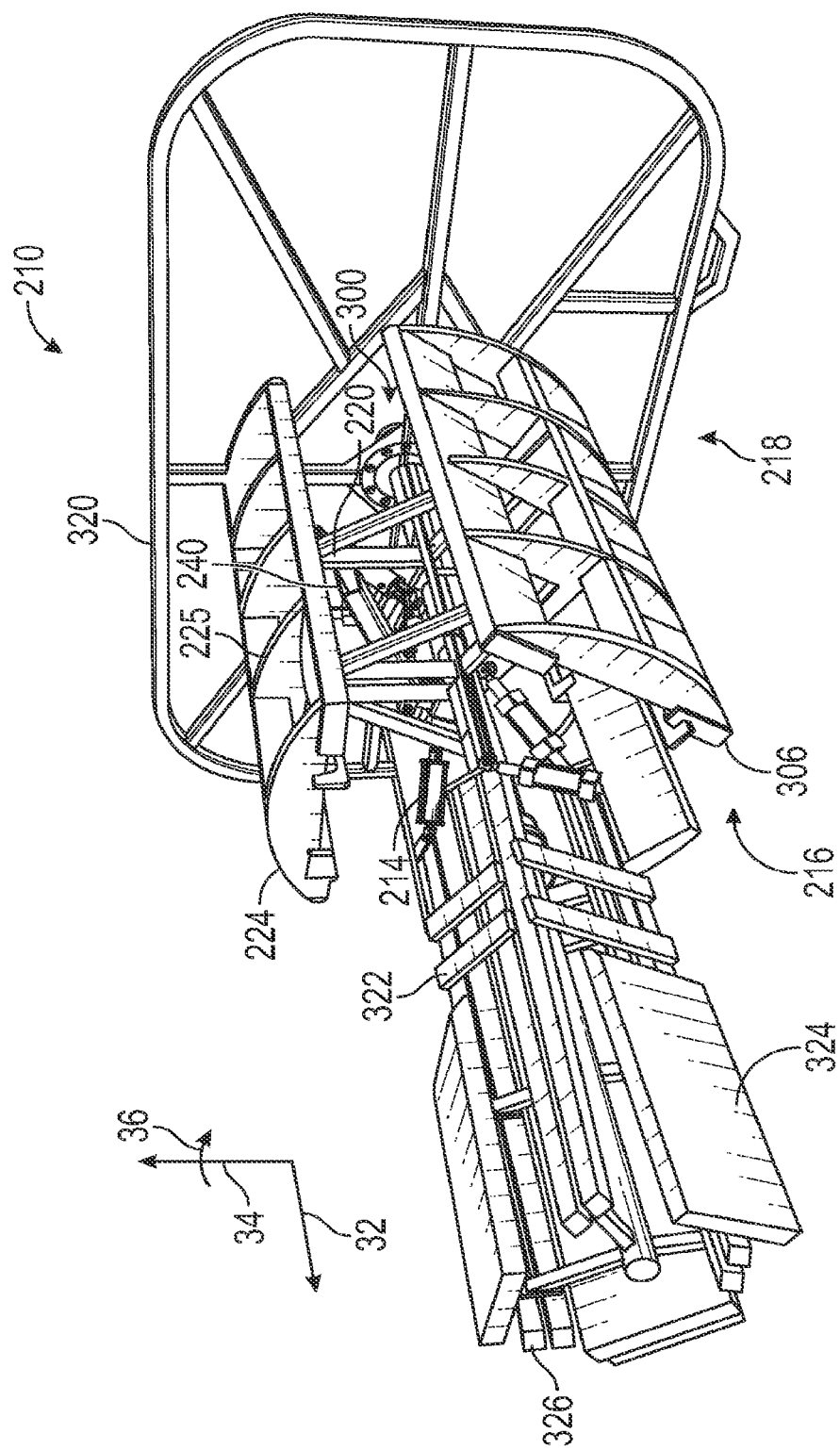
FIG. 12 is a perspective view of a drum assembly according to embodiments of the present disclosure.

FIG. 12 illustrates a perspective view of another embodiment of the drum assembly 210. Elements in common with those shown in FIG. 11 are labeled with the same reference numerals. As shown in FIG. 12, the drum assembly 210 includes containment flange 320 coupled to the support bar 214 or other portions of the drum assembly 210 at the second end 218 so the containment flange 320 rotates together with the drum assembly 210 during deployment of the spoolable pipe 12. The containment flange 320 may be used to help contain the coil 30 while disposed on the drum assembly 210. In other words, the containment flange 320 may help block the spoolable pipe 12 of the coil 30 from moving or shifting outside of the containment flange 320. The open structure provided by the containment flange 320 may help reduce the overall weight of the drum assembly 210, but in other embodiments, a solid structure may be used for the containment flange 320. The containment flange 320 may have a variety of shapes, such as, but not limited to circles, ovals, rectangles, squares, polygons, and so forth. In the illustrated embodiment, the drum assembly 210 includes a plurality of folding arms 322 disposed at the first end 216. Although three folding arms 322 are shown in FIG. 12, in other embodiments, there may be two, four, five, six, or more folding arms 322. In the illustrated embodiment, the plurality of folding arms 322 are shown in a collapsed configuration such that the plurality of folding arms 322 are generally parallel to the axial axis 32 of the drum assembly 210. In the collapsed configuration, the drum assembly 210 may be more easily inserted into the interior channel 38 of the coil 30. After the coil 30 has been placed over the plurality of drum segments 224, the plurality of folding arms 322 may be folded open to be generally perpendicular to the axial axis 32 of the drum assembly 210 (i.e., an expanded configuration). Thus, the coil 30 may be generally contained between the containment flange 320 and plurality of folding arms 322. Although three drum segments 224 are shown in FIG. 12, in other embodiments, there may be two, four, five, six, or more drum segments 224. In FIG. 12, the plurality of drum segments 224 are shown without covers to illustrate one or more ribs 225 found inside the drum segments 224 that are used to provide structural stability to the drum segments 224. In certain embodiments, each of the plurality of folding arms 322 may include a pad 324 coupled to the folding arm via a spring mechanism 326 to accommodate coils 30 with different axial dimensions 40. In certain embodiments, the containment flange 320 may be replaced by one or more of the plurality of folding arms 322, which may be installed to be able to fold or installed in a fixed manner similar to the containment flange 320. Although one embodiment of a drum assembly 210 that may be used with the installation trailer 10 is shown in FIG. 12, other embodiments of the drum assembly 210 with different, additional, or fewer features may also be used with the installation trailer 10. For example, the drum assembly 210 may have a different number or arrangement of drum segments 224, a different number or arrangement of folding arms 322, containment flanges 320 located at both the first and second ends 216 and 218, one or two containment flanges 320 coupled to one or more hydraulic cylinders to enable the one or two containment flanges 320 to move axially 32 toward the coil 30 for containment purposes, and so forth. For example, the containment flange 320 may be replaced with folding arms 322, whether fixed or foldable.

Figure 13:
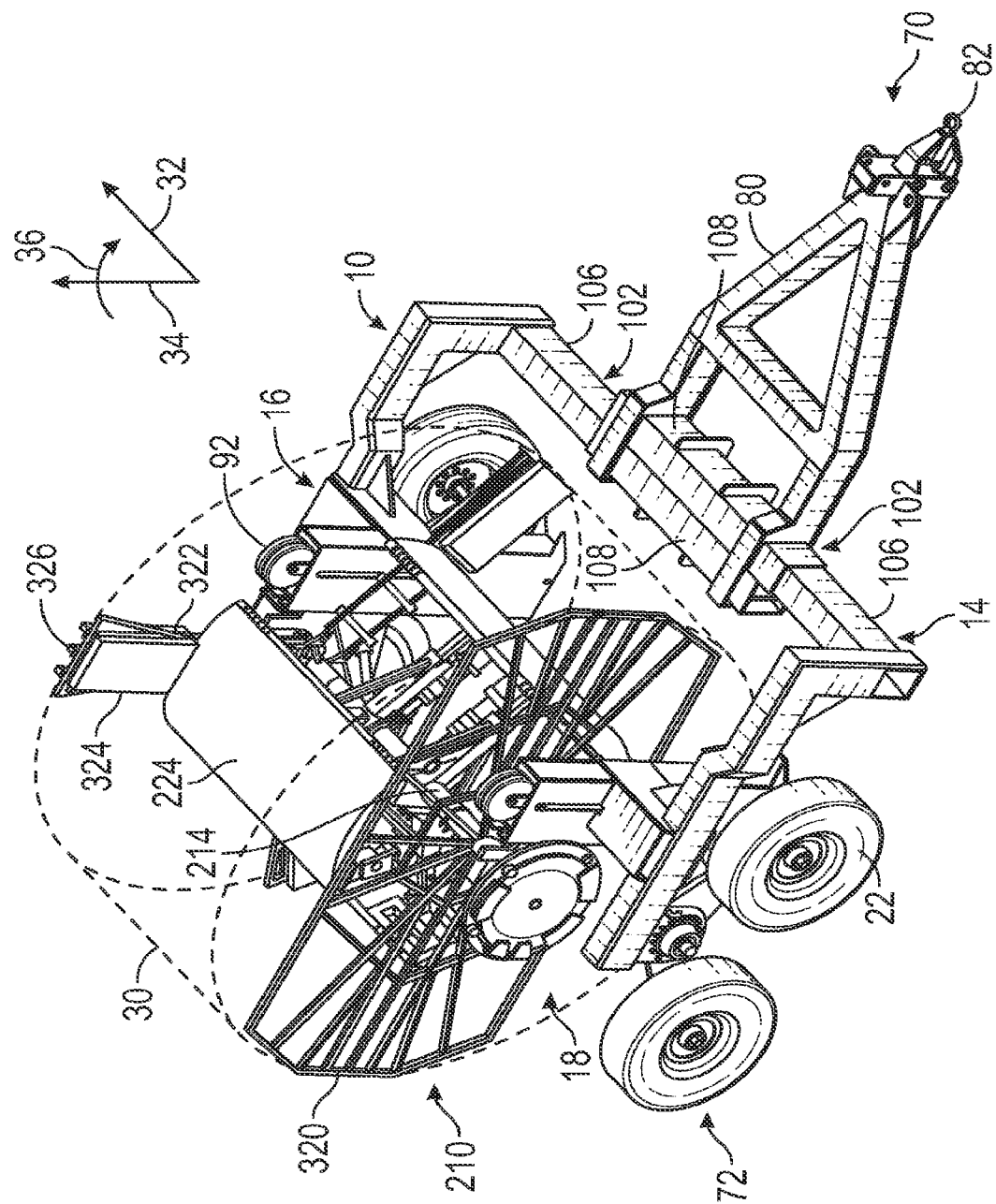
FIG. 13 is a perspective view of a collapsible installation trailer and a drum assembly according to embodiments of the present disclosure.

FIG. 13 illustrates a perspective view of embodiments of both the installation trailer 10 and the drum assembly 210 shown in FIG. 12. The coil 30 is represented by a transparent cylinder so the details of the drum assembly 210 can be seen. In addition, the hydraulic power unit 20 has been removed for clarity. The support bar 214 of the drum assembly 210 is supported in the lifting hooks 88 of the installation trailer 10. Thus, the lifting mechanism 16 can be used to raise the coil 30 disposed on the drum assembly 210 for deployment. When deployment of the spoolable pipe 12 is complete, the lifting mechanism 16 can be used to lower the drum assembly 210 to the ground and disengage the support bar 214 from the lifting hooks 88. At this point, the drum assembly 210 can be removed or the installation trailer 10 moved away from the drum assembly 210. If additional spoolable pipe 12 is to be deployed, the same or different drum assembly 210 with another coil 30 can be placed in the installation trailer 10 or the installation trailer moved to the drum assembly 210. The lifting mechanism 16 can also be used to lower partial coils 30 (i.e., drum assembly 210 that has some remaining spoolable pipe 12) to the ground. Thus, the configuration and location of the lifting mechanism 16 on the installation trailer 10 enables various configurations and modalities of drum assemblies 210 with or without full or partial coils 30 to be lifted for deployment and lowered to the ground.

Figure 14:
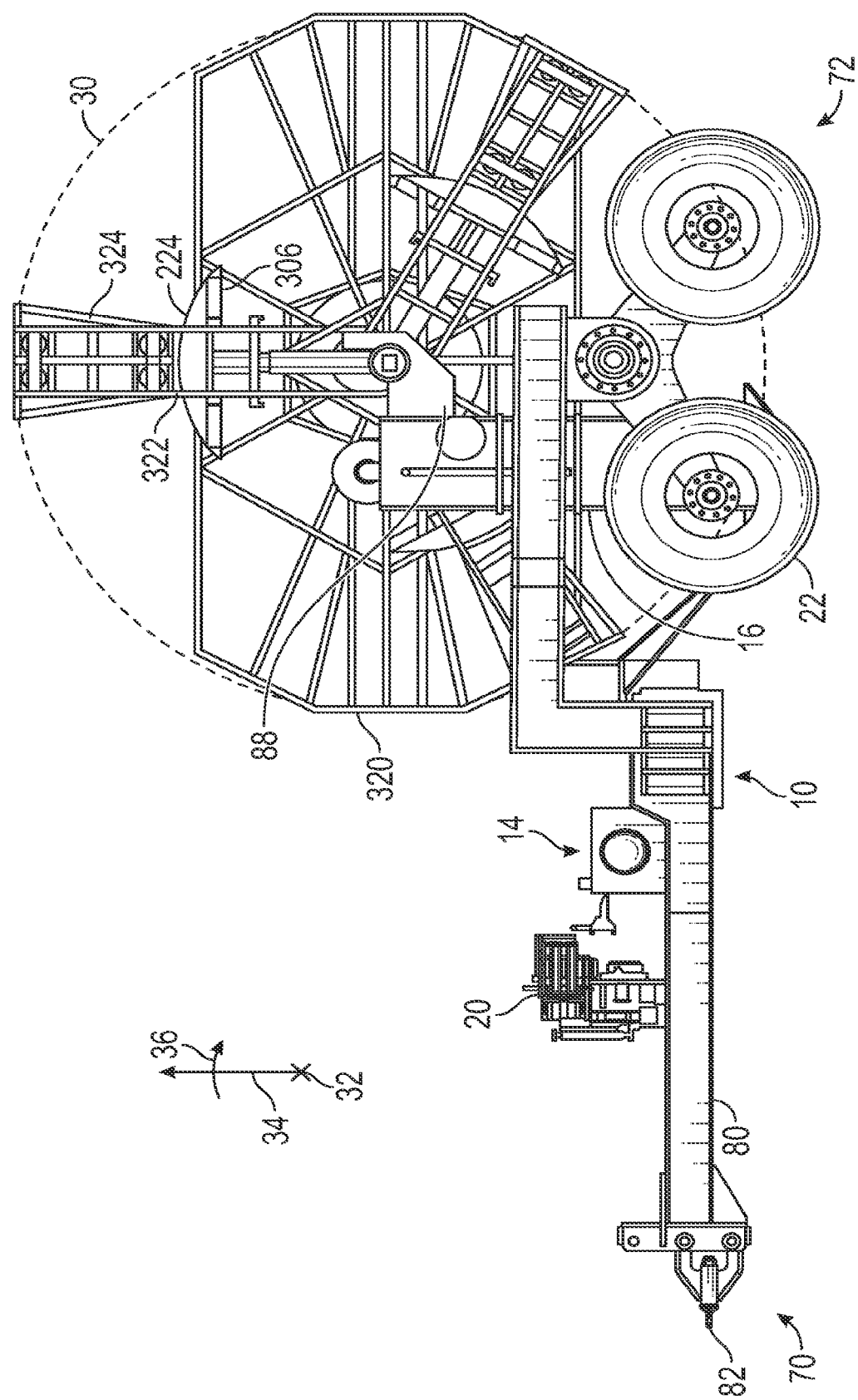
FIG. 14 is a side view of a collapsible installation trailer and a drum assembly according to embodiments of the present disclosure.

FIG. 14 illustrates a side view of embodiments of both the installation trailer 10 and the drum assembly 210 shown in FIG. 12 with the drum assembly 210 and coil 30 in a raised position. The installation trailer 10 is capable of lowering the empty drum assembly 210 to the ground because of the range of motion provided by the lifting mechanism 16.

Figure 15:
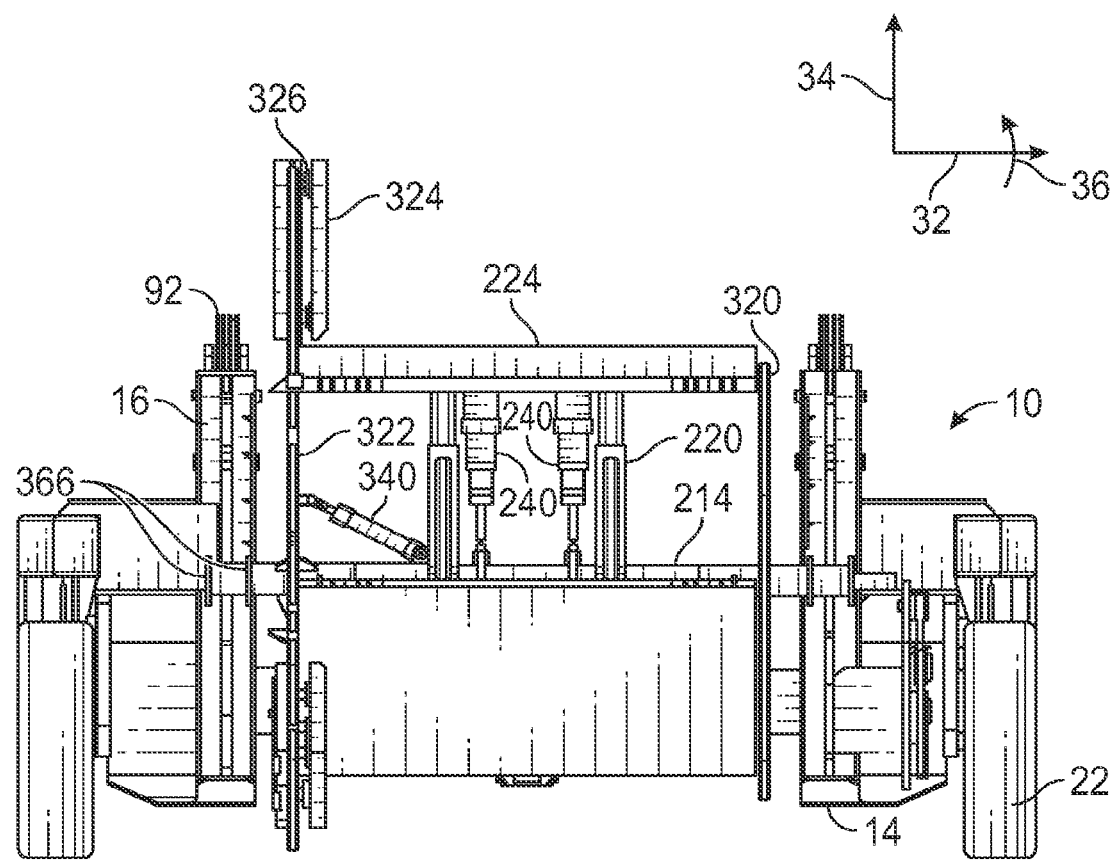
FIG. 15 is a rear view of a collapsible installation trailer and a drum assembly according to embodiments of the present disclosure.

FIG. 15 illustrates a rear view of embodiments of both the installation trailer 10 and the drum assembly 210 shown in FIG. 12 with the drum assembly 210 shown in a lowered position and without the coil 30. Elements in common with those shown in previous figures are labeled with the same reference numerals. As shown in FIG. 15, one or more hydraulic cylinders 340 may be used to move the plurality of folding arms 322 between expanded and collapsed configurations. The hydraulic cylinders 340 can be connected to and powered by the hydraulic power unit 20 when used with the installation trailer 10.

Figure 16:
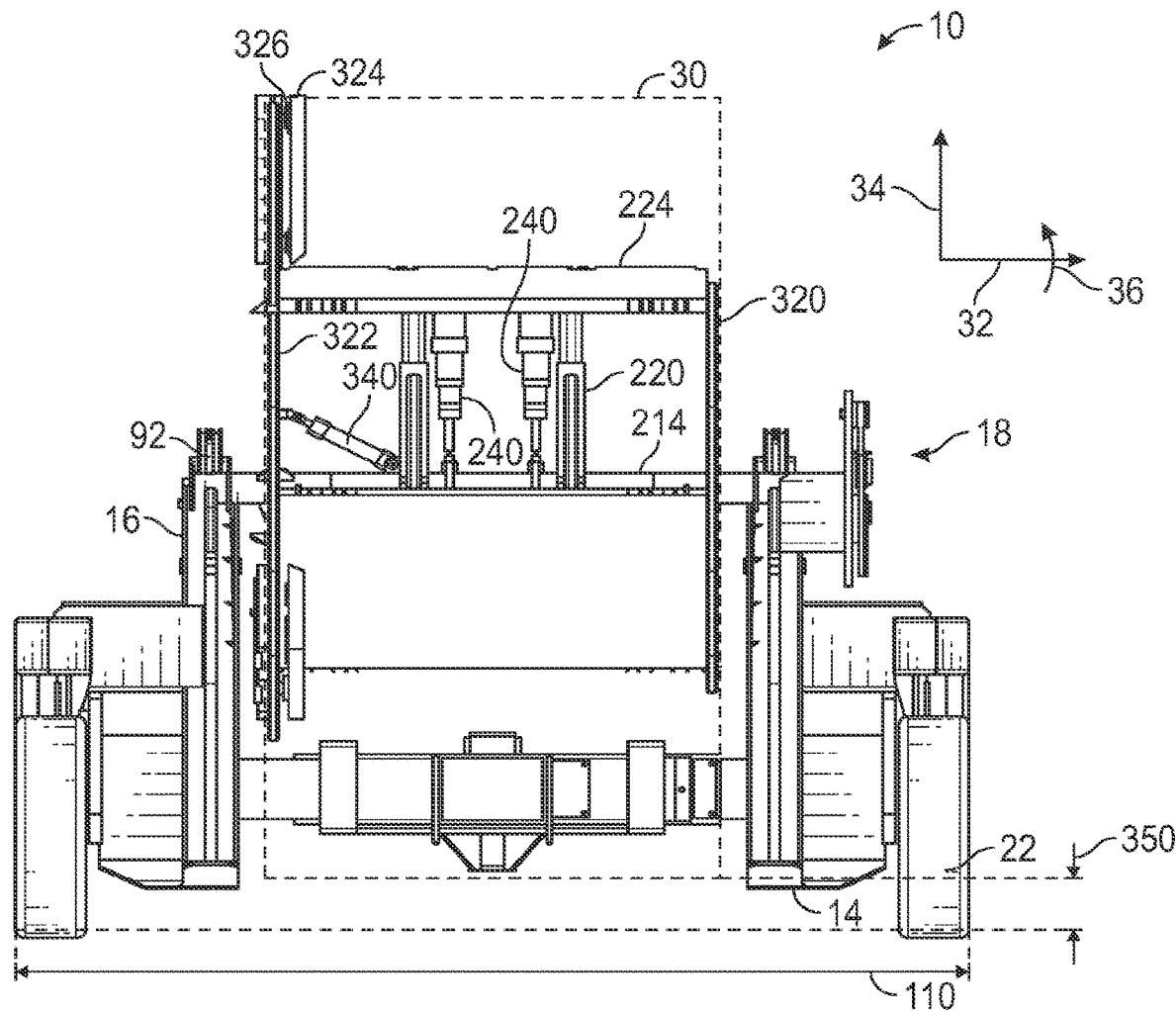
FIG. 16 is a rear view of a collapsible installation trailer and a drum assembly according to embodiments of the present disclosure.

FIG. 16 illustrates a rear view of embodiments of both the installation trailer 10 and the drum assembly 210 shown in FIG. 12 with the drum assembly 210 shown in a raised position and with the coil 30. Elements in common with those shown in previous figures are labeled with the same reference numerals. As shown in FIG. 16, the lifting mechanism 16 raises the drum assembly 210 so that a desired clearance 350 between the bottom of the coil 30 and the ground is achieved.

Figure 17:
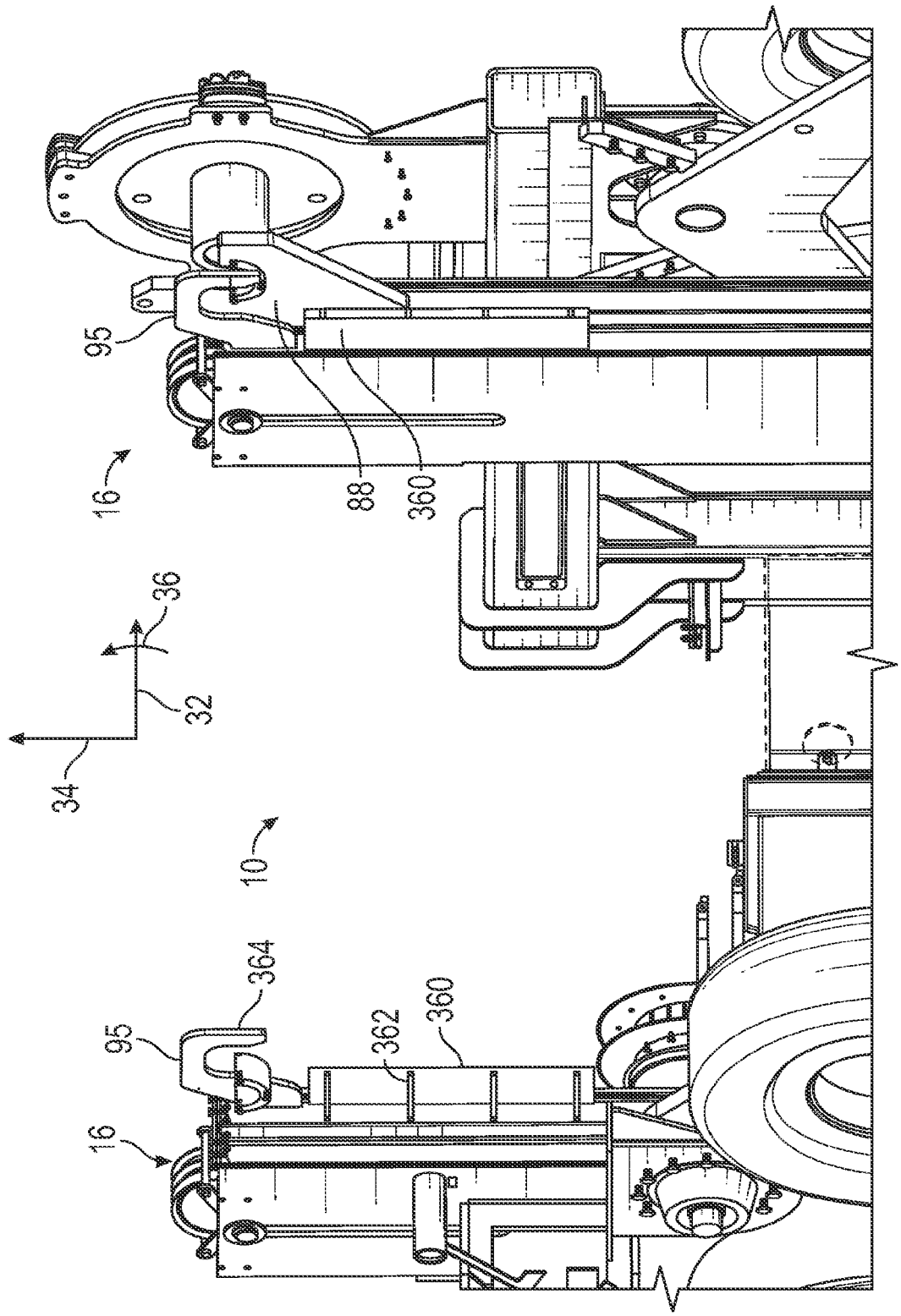
FIG. 17 is a perspective view of a portion of a collapsible installation trailer according to embodiments of the present disclosure.

FIG. 17 illustrates a perspective view of a portion of an embodiment of the installation trailer 10 that includes guide plates 360 coupled to the lifting mechanisms 16. Note that one of the lifting hooks 88 has been omitted from FIG. 17 to enable the guide plate 360 to be clearly visible. The guide plate 360 may be a rectangular-shaped piece of metal and the connection to the lifting mechanism 16 may be reinforced by one or more ribs 362. In other embodiments, the guide plate 360 may have other shapes and configurations. The connection between the guide plate 360 and the lifting mechanism 16 may be accomplished via welding, brazing, or other mechanical fastening techniques. When the installation trailer 10 is moved toward the drum assembly 210, the guide plates 360 may be used so the drum assembly 210 is positioned properly with respect to the lifting hooks 88. In other words, if the drum assembly 210 is not aligned properly, the guide plates 360 may either push the drum assembly 210 into the proper position and/or push the installation trailer 10 into a different position with respect to the drum assembly 210. When the installation trailer 10 is used with reels 60, the guide plates 360 may be used in a similar manner with respect to the shaft used with the reel 60. In certain embodiments, the shaft may include one or more alignment features 366 (as shown in FIG. 15) that coordinate with the guide plates 360.

The embodiment of the installation trailer 10 shown in FIG. 17 also illustrates additional variations of some of the features previously discussed. For example, the vertical stop 95 is shaped differently than that shown in FIG. 4. Specifically, the vertical stop 95 includes a horizontal stop portion 364 to block movement of the shaft or similar portion of the reel 60 or a device used to manipulate coils 30 in the horizontal direction (e.g., generally parallel to the axial axis 32).

Figure 18:
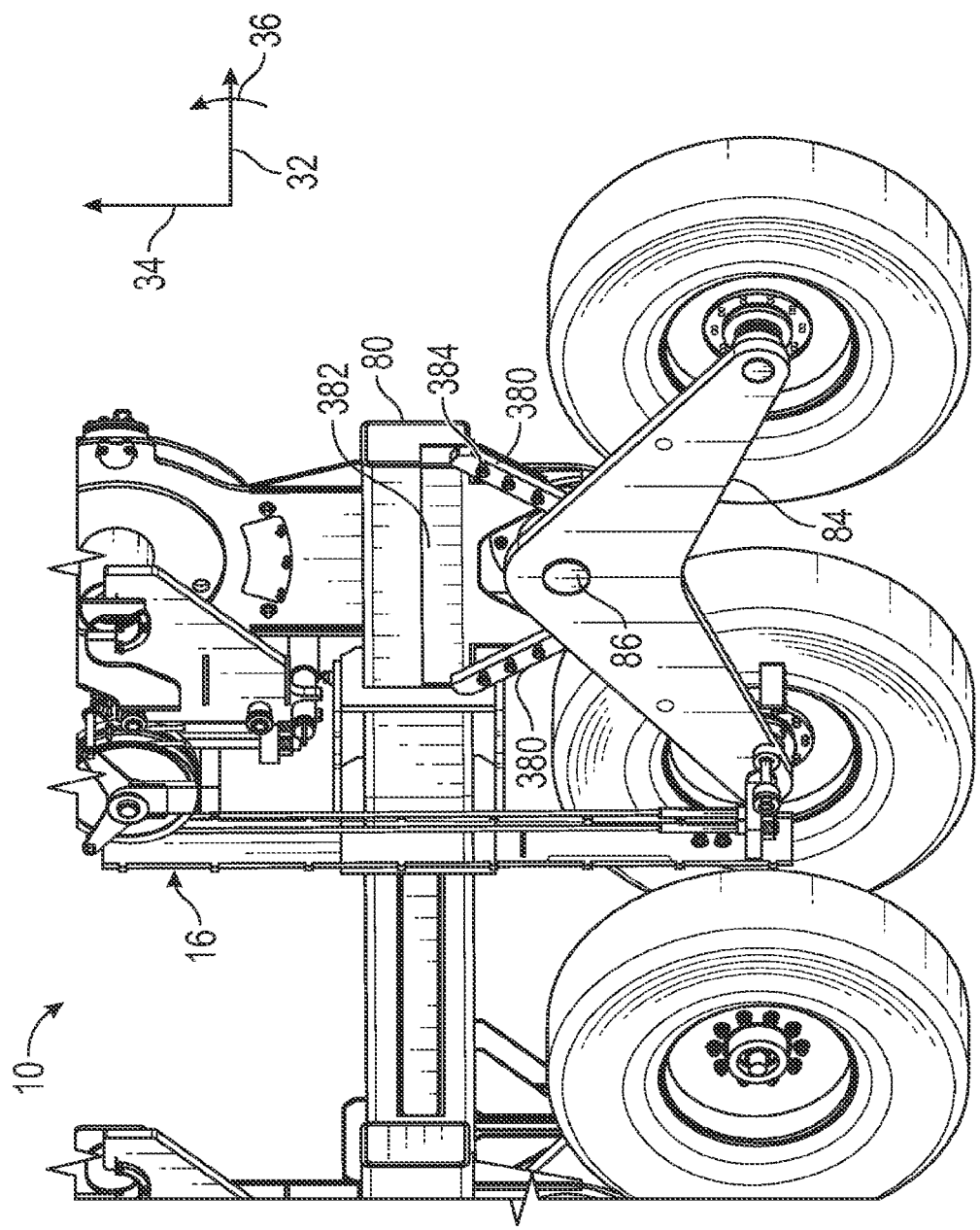
FIG. 18 is a perspective view of a portion of a collapsible installation trailer according to embodiments of the present disclosure.

FIG. 18 illustrates a perspective view of a portion of an embodiment of the installation trailer 10 that includes stop plates 380 coupled to a support plate 382 that is then coupled to structural member 80 via one or more fasteners 384. Portions of the lifting mechanism 16 have been omitted for clarity. The stop plates 380 block excessive movement of the frame 84 about the pivot 86. The stop plates 380 may be rectangular-shaped pieces of metal, but have other shapes in other embodiments. The connection between the stop plates 380 and the support plate 382 may be accomplished via welding, brazing, or other mechanical fastening techniques. In certain embodiments, the support plate 382 may be omitted and the stop plates 380 coupled directly to the structural member 80.

Figure 19:
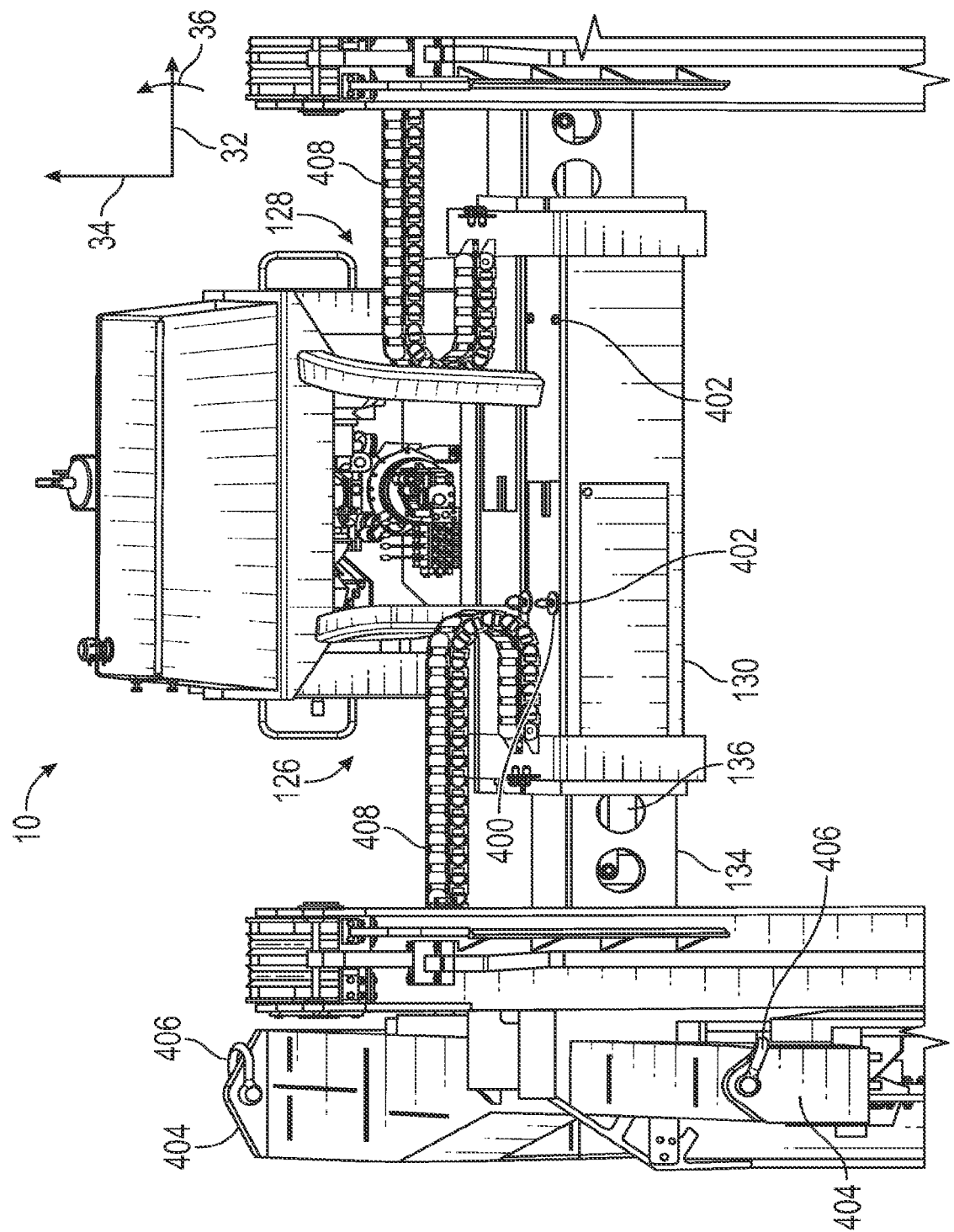
FIG. 19 is a perspective view of a portion of a collapsible installation trailer according to embodiments of the present disclosure.

FIG. 19 illustrates a perspective view of a portion of an embodiment of the installation trailer 10 that includes one or more telescoping side locking pins 400 inserted through locking pin holes 402 formed in the left outer structural member 130 and the left inner structural member 134. After the left inner structural member 134 has been extended by the left hydraulic cylinder 136, the locking pins 400 may be inserted into the locking pin holes 402 to block movement of the left inner structural member 134, such as upon a failure or loss of hydraulic pressure in the left hydraulic cylinder 136. When the installation trailer 10 is to be collapsed, the locking pins 400 may be removed from the locking pin holes 402 to enable the left inner structural member 134 to be pulled into the left outer structural member 130 by the left hydraulic cylinder 136. In certain embodiments, the locking pins 400 may be inserted into different locking pin holes 402 when the installation trailer 10 is collapsed to block movement of the left inner structural member 134. Locking pins 400 and locking pin holes 402 may also be provided for the right side 128 of the installation trailer 10 and be used in a similar manner as that described above for the left side 126. Although two locking pins 400 are shown for each side in FIG. 19, different numbers of locking pins 400 may be used in other embodiments.

Figure 20:
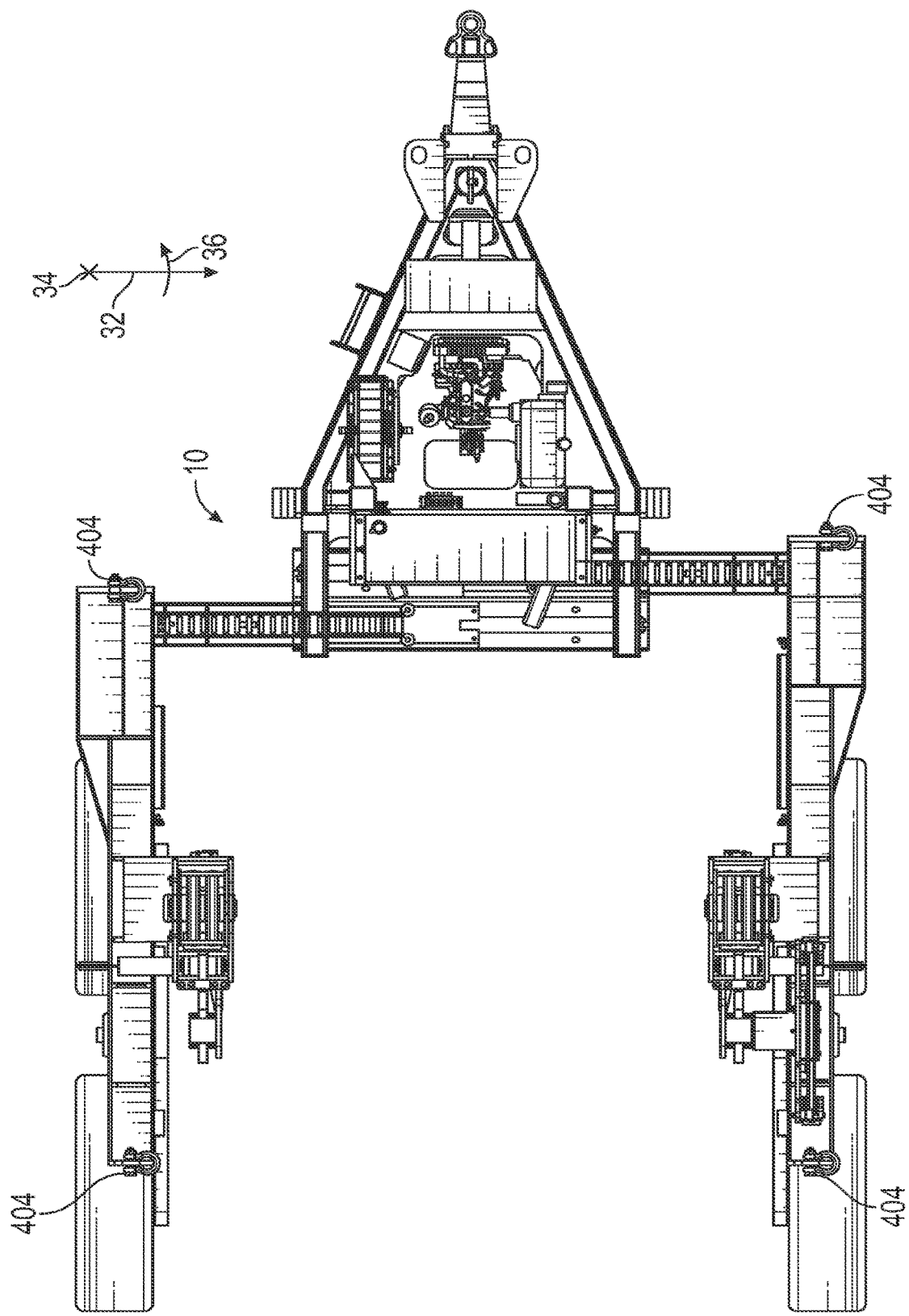
FIG. 20 is a top view of a collapsible installation trailer according to embodiments of the present disclosure.

FIG. 19 also illustrates one or more lifting lugs 404 coupled to the installation trailer 10. In certain embodiments, each of the lifting lugs 404 may include a shackle 406 to enable the lifting lugs 404 to be used when lifting the installation trailer 10, such as via a crane or other lifting device. In certain embodiments, four lifting lugs 404 may be located about the perimeter of the installation trailer 10 as shown in FIG. 20. In some embodiments, one or more hydraulic hose tracks 408 may be used to protect the hydraulic hoses of the installation trailer 10 when it moves between expanded and collapsed configurations.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:
1. A pipe installation trailer, comprising:
  a trailer frame, wherein the trailer frame comprises:
    a first portion that includes an outer structural member; and
    a second portion that includes an inner structural member, wherein the inner structural member of the second portion is configured to move telescopically within the outer structural member of the first portion to facilitate transitioning the pipe installation trailer between a collapsed width and an expanded width; and
  a braking assembly secured on the trailer frame, wherein the braking assembly comprises:
    a brake rotor;
    a brake shaft that extends out from the brake rotor, wherein the brake shaft comprises a keyed opening that is keyed with one or more flat inner surfaces that are configured to interlock with one or more flat outer surfaces keyed on a drum shaft of a pipe drum to tie rotation of the brake rotor with rotation of the pipe drum; and
    a brake pad configured to selectively engage the brake rotor to facilitate controlling rotation of the pipe drum on the pipe installation trailer and, thus, deployment of flexible pipe from the pipe drum.

2. The pipe installation trailer of claim 1, comprising a lifting assembly secured to the trailer frame, wherein the lifting assembly is configured to:
raise the pipe drum to engage the drum shaft of the pipe drum with the brake shaft in the braking assembly;
lower the pipe drum to disengage the drum shaft of the pipe drum from the brake shaft in the braking assembly; or
both.

3. The pipe installation trailer of claim 2, comprising a mechanical lockout assembly configured to selectively lock the lifting assembly in a raised position.

4. The pipe installation trailer of claim 2, wherein the lifting assembly comprises:
a hook configured to engage the drum shaft of the pipe drum; and
an actuator coupled to the hook, wherein the actuator is configured to move the hook to facilitate raising the drum shaft of the pipe drum, lowering the drum shaft of the pipe drum, or both.

5. The pipe installation trailer of claim 4, wherein the lifting assembly comprises a vertical stop configured to block the drum shaft of the pipe drum from disengaging from the hook in the lifting assembly and the brake shaft in the braking assembly while the pipe drum is in a raised position.

6. The pipe installation trailer of claim 4, wherein:
the hook in the lifting assembly is configured to engage a first end of the drum shaft of the pipe drum; and
the lifting assembly comprises:
another hook configured to engage a second end of the drum shaft of the pipe drum;
another actuator coupled to the another hook, wherein the another actuator is configured to move the another hook to facilitate raising the drum shaft of the pipe drum, lowering the drum shaft of the pipe drum, or both.

7. The pipe installation trailer of claim 1, wherein:
the trailer frame comprises a third portion that includes another inner structural member; and
the first portion of the trailer frame comprises another outer structural member, wherein the another inner structural member of the third portion is configured to move telescopically within the another outer structural member of the first portion to facilitate transitioning the pipe installation trailer between the collapsed width and the expanded width.

8. The pipe installation trailer of claim 1, comprising a wheel assembly, wherein the wheel assembly comprises:
a wheel frame pivotably secured to the trailer frame to enable the wheel assembly to pivot with respect to the trailer frame;
a first wheel rotatably secured to a first side of the wheel frame; and
a second wheel rotatably secured to a second side of the wheel frame.

9. A pipe installation trailer, comprising:
a trailer frame, wherein the trailer frame comprises:
a first portion that includes an outer structural member; and
a second portion that includes an inner structural member, wherein the inner structural member of the second portion is configured to move telescopically within the outer structural member of the first portion to facilitate transitioning the pipe installation trailer between a collapsed width and an expanded width; and
a wheel assembly, wherein the wheel assembly comprises:
a wheel frame pivotably secured to the trailer frame to enable the wheel assembly to pivot with respect to the trailer frame;
a first wheel rotatably secured to a first side of the wheel frame; and
a second wheel rotatably secured to a second side of the wheel frame.

10. The pipe installation trailer of claim 9, comprising at least one stop plate secured to the trailer frame, wherein the at least one stop plate is configured to block pivoting of the wheel frame beyond a desired amount.

11. The pipe installation trailer of claim 10, wherein the at least one stop plate comprises:
a first stop plate configured to block pivoting of the wheel frame beyond the desired amount in a first direction; and
a second stop plate configured to block pivoting of the wheel frame beyond the desired amount in a second direction.

12. The pipe installation trailer of claim 9, comprising a braking assembly secured on the trailer frame, wherein the braking assembly comprises:
a brake rotor;
a brake shaft that extends out from the brake rotor, wherein the brake shaft comprises a keyed opening that is keyed with one or more flat inner surfaces that are configured to interlock with one or more flat outer surfaces keyed on a drum shaft of a pipe drum to tie rotation of the brake rotor with rotation of the pipe drum; and
a brake pad configured to selectively engage the brake rotor to facilitate controlling rotation of the pipe drum on the pipe installation trailer and, thus, deployment of flexible pipe from the pipe drum.

13. The pipe installation trailer of claim 9, comprising another wheel assembly, wherein the another wheel assembly comprises:
another wheel frame pivotably secured to the trailer frame to enable the another wheel assembly to pivot with respect to the trailer frame;
a third wheel rotatably secured to a third side of the another wheel frame; and
a fourth wheel rotatably secured to a fourth side of the another wheel frame.

14. The pipe installation trailer of claim 9, comprising a lifting assembly secured on the trailer frame and configured to raise a pipe drum, lower the pipe drum, or both, wherein the lifting assembly comprises:
a hook configured to engage a drum shaft of a pipe drum; and
an actuator coupled to the hook, wherein the actuator is configured to move the hook to facilitate raising the drum shaft of the pipe drum, lowering the drum shaft of the pipe drum, or both.

15. The pipe installation trailer of claim 9, wherein:
the trailer frame comprises a third portion that includes another inner structural member; and
the first portion of the trailer frame comprises another outer structural member, wherein the another inner structural member of the third portion is configured to move telescopically within the another outer structural member of the first portion to facilitate transitioning the pipe installation trailer between the collapsed width and the expanded width.

16. A pipe installation trailer comprising a trailer frame, wherein the trailer frame comprises:
- a first side portion that includes a first inner structural member;
- a second side portion that includes a second inner structural member; and
- a central portion between the first side portion and the second side portion, wherein the central portion comprises:
  - a first outer structural member, wherein the first inner structural member of the first side portion is configured to move telescopically within the first outer structural member of the central portion to facilitate transitioning the pipe installation trailer between a collapsed width and an expanded width; and
  - a second outer structural member, wherein the second inner structural member of the second side portion is configured to move telescopically within the second outer structural member of the central portion to facilitate transitioning the pipe installation trailer between the collapsed width and the expanded width.

17. The pipe installation trailer of claim 16, wherein: the first side portion of the trailer frame comprises:
- a first vertical structural member secured to a first axial end of the first inner structural member; and
- a first horizontal structural member secured to a first upper end of the first vertical structural member; and the second side portion of the trailer frame comprises:
- a second vertical structural member secured to a second axial end of the second inner structural member; and
- a second horizontal structural member secured to a second upper end of the second vertical structural member.

18. The pipe installation trailer of claim 16, wherein the central portion of the trailer frame comprises a trailer hitch.

19. The pipe installation trailer of claim 16, comprising a braking assembly secured on the trailer frame, wherein the braking assembly comprises:
- a brake rotor;
- a brake shaft that extends out from the brake rotor, wherein the brake shaft comprises a keyed opening that is keyed with one or more flat inner surfaces that are configured to interlock with one or more flat outer surfaces keyed on a drum shaft of a pipe drum to tie rotation of the brake rotor with rotation of the pipe drum; and
- a brake pad configured to selectively engage the brake rotor to facilitate controlling rotation of the pipe drum on the pipe installation trailer and, thus, deployment of flexible pipe from the pipe drum.

20. The pipe installation trailer of claim 16, comprising a lifting assembly secured on the trailer frame and configured to raise a pipe drum, lower the pipe drum, or both, wherein the lifting assembly comprises:
- a hook configured to engage a drum shaft of a pipe drum; and
- an actuator coupled to the hook, wherein the actuator is configured to move the hook to facilitate raising the drum shaft of the pipe drum, lowering the drum shaft of the pipe drum, or both.

* * * * *